(12) United States Patent
Yonushonis et al.

(10) Patent No.: US 11,772,673 B2
(45) Date of Patent: Oct. 3, 2023

(54) SYSTEMS AND METHODS TO ISSUE WARNINGS TO ENHANCE THE SAFETY OF BICYCLISTS, PEDESTRIANS, AND OTHERS

(71) Applicant: Cummins Inc., Columbus, IN (US)

(72) Inventors: Thomas M. Yonushonis, Columbus, IN (US); J. Stephen Wills, Columbus, IN (US); Jennifer Kay Light-Holets, Greenwood, IN (US); Joseph P. Chandraraj, Pimple Nilakh Pune (IN)

(73) Assignee: Cummins Inc., Columbus, IN (US)

( * ) Notice: Subject to any disclaimer, the term of this patent is extended or adjusted under 35 U.S.C. 154(b) by 25 days.

(21) Appl. No.: 16/874,056

(22) Filed: May 14, 2020

(65) Prior Publication Data
US 2020/0361483 A1 Nov. 19, 2020

Related U.S. Application Data

(60) Provisional application No. 62/848,224, filed on May 15, 2019.

(51) Int. Cl.
| | | |
|---|---|---|
| *B60W 50/14* | (2020.01) | |
| *B60W 30/095* | (2012.01) | |
| *G01C 21/34* | (2006.01) | |

(52) U.S. Cl.
CPC ........ *B60W 50/14* (2013.01); *B60W 30/0953* (2013.01); *B60W 30/0956* (2013.01); *G01C 21/3461* (2013.01); *B60W 2050/143* (2013.01)

(58) Field of Classification Search
CPC ............ B60W 50/14; B60W 30/0953; B60W 30/0956; B60W 2050/143
See application file for complete search history.

(56) References Cited

U.S. PATENT DOCUMENTS

| | | |
|---|---|---|
| 7,095,336 B2 | 8/2006 | Rodgers et al. |
| 8,537,030 B2 | 9/2013 | Perkins |
| 8,547,249 B2 | 10/2013 | David |
| 8,854,229 B2 | 10/2014 | Kim et al. |
| 9,079,533 B2 | 7/2015 | Pottier et al. |

(Continued)

FOREIGN PATENT DOCUMENTS

JP 2004301649 A * 10/2004

*Primary Examiner* — Vivek D Koppikar
*Assistant Examiner* — Jeffrey R Chalhoub
(74) *Attorney, Agent, or Firm* — Faegre Drinker Biddle & Reath LLP

(57) ABSTRACT

Systems and methods for triggering and issuing safety warnings, including a risk-assessment system that collects movement data pertaining to each of a plurality of subsystems including one or more slow-moving subsystems (SMSSs) and/or one or more fast-moving subsystems (FMSSs). The risk-assessment system identifies, based at least in part on the collected movement data, an instance in which each of a set of warning-triggering conditions is true. The set includes (i) that a likelihood of a collision occurring among an identified subset of the plurality of subsystems is greater than a collision-probability threshold and (ii) that at least one of the subsystems in the identified subset has at least one current movement anomaly. In response to identifying the instance, the risk-assessment system issues at least one warning to at least one of the subsystems in the identified subset.

21 Claims, 13 Drawing Sheets

(56) References Cited

U.S. PATENT DOCUMENTS

| | | | |
|---|---|---|---|
| 9,421,909 B2 | 8/2016 | Strickland et al. | |
| 9,505,412 B2 | 11/2016 | Bai | |
| 9,868,394 B1* | 1/2018 | Fields | G08G 1/096758 |
| 10,156,848 B1* | 12/2018 | Konrardy | G05D 1/0246 |
| 2018/0075747 A1* | 3/2018 | Pahwa | B60W 40/10 |
| 2018/0156624 A1* | 6/2018 | Bai | G08G 1/0129 |
| 2019/0102689 A1* | 4/2019 | Lassoued | G07C 5/008 |
| 2019/0137622 A1* | 5/2019 | Lopez-Hinojosa | G01S 13/865 |

* cited by examiner

SYSTEMS AND METHODS TO ISSUE WARNINGS TO ENHANCE THE SAFETY OF BICYCLISTS, PEDESTRIANS, AND OTHERS

CROSS-REFERENCE TO RELATED APPLICATIONS

This application claims the benefit of U.S. Prov. Pat. Appl. No. 62/848,224, filed May 15, 2019, which is incorporated herein in its entirety.

FIELD OF THE DISCLOSURE

The present disclosure relates to vehicle-based and pedestrian-based systems, location-determination systems (LDSs), and various types of communication including vehicle-to-vehicle (V2V), vehicle-to-pedestrian (V2P), and vehicle-to-infrastructure (V2I), and more particularly to systems and methods for triggering and issuing safety warnings to enhance the safety of bicyclists, pedestrians, bicyclists, and others.

BACKGROUND

In today's modern world, millions of people use all sorts of vehicles to go on all sorts of excursions for all sorts of reasons such as recreation, work, errands, exercise, and the like. And still there are millions of people that get around, get exercise, and the like the old-fashioned way: on their own two feet—i.e., as pedestrians that are walking, jogging, running, etc. Taken together, the movements of individuals and groups in today's society can fairly be characterized at various different times as either slow-moving or fast-moving. It may be difficult to draw a bright line between the two, and any person at any time could be in (or on, etc.) a vehicle that, depending on the type of vehicle and the current manner of operation, could be either slow-moving or fast-moving, or could instead be on their feet, perhaps walking or jogging, in which case they would likely be categorized for purposes of this disclosure as slow-moving. In the name of safety, it is desirable to prevent collisions between and among vehicles irrespective of their categorization as slow-moving or fast-moving, and between and among pedestrians and vehicles.

OVERVIEW

Disclosed herein are systems and methods for triggering and issuing safety warnings. In various different embodiments, safety warnings are triggered by one or more of what are referred to herein as computing-and-communication systems (CCSs) detecting the occurrence, presence, and/or the like of one or more of what are referred to herein as warning-triggering conditions (e.g., states of one or more measured parameters, one or more occurrences of one or more events, and/or the like), and responsively issuing one or more safety warnings. In various different embodiments, the issuing of a given safety warning takes the form of one or more CCSs transmitting one or more warning messages to one or more other CCSs, one or more CCSs presenting (e.g., visually, audibly, tactilely, and/or the like) one or more safety-warning indications, and/or one or more CCSs taking one or more other suitable warning-related actions.

Advantageously, CCSs described herein can be implemented to warn a vehicle that a pedestrian, bicyclist, or a slower moving vehicle lie ahead. The pedestrian, bicyclist, or slower moving vehicle may be distracted, or perhaps visibility is poor due to weather conditions or darkness. The CSSs can be implemented to warn the leading, trailing, or both persons of the presence of the other. For example, the pedestrian's phone may flash a light to indicate the pedestrian's presence to the driver, or the phone may vibrate to alert the pedestrian about the oncoming vehicle. A message could also be displayed on the pedestrian's phone indicating an alternative, safer, path. Statistical analysis may be used to determine that the oncoming vehicle is being driven in an unsafe or abnormal manner, to warn the bicyclist. The statistical analysis may be based on excessive speed or swerving, acceleration or deceleration events, active use of cell phones, speed limits, terrain (hills or curves), accident rates, and the like. Additionally, the CCS may adjust the analysis if the driver is from a country with opposite traffic patterns, e.g. driving on right lane vs. left lane. The CSSs may also be programmed to increase parking lot and warehouse safety. For example, a truck may monitor the presence of individuals around the truck before initiating movement and warn them, on their mobile devices for example, of impending motion.

Additionally, CCSs described herein can be implemented to provide audible, visual, and/or haptic feedback to people around electric (including hybrid) vehicles, which are quiet compared to combustion-engine powered vehicles. The feedback may replace the traditional sound of a combustion engine running. The electric vehicle may generate a signal to indicate that it is operational. The signal may be generated by a VSS or VMSS (described below) The signal may generate an indication displayed on stationary devices in a facility, and/or may generate an audible or visual indication broadcast from the vehicle, and/or may generate an audible or visual or haptic indication provided by NVSSs (described below) carried by persons in a work area including the vehicle.

Modern society is replete with CCSs, some of which are portable and generally carried by and associated with particular subscriber accounts of particular people (or groups of people, companies, organizations, or the like). Such CCSs are referred to herein as non-vehicular subsystems (NVSSs), some examples of which include cell phones, smartphones, tablets, wearables, laptops, and the like. Other CCSs are associated permanently or semi-permanently with particular vehicles (as opposed to being associated with particular people, groups of people, etc.), and are referred to herein as vehicular subsystems (VSSs). One example type of VSS, which are referred to herein as vehicle-mounted subsystems (VMSSs), come with and are integrally formed as part of modern automobiles, motorcycles, Segway® scooters, and the like. Another example type of VSS is a cycling computer, which might be removably attached to a given user's bicycle and therefore be associated only semi-permanently with that vehicle. And certainly other example types of NVSSs and VSSs are known to those of skill in the art and could be listed here. Moreover, there are also many additional types of CCSB such as network servers (e.g., cloud servers), desktop computers, and many others.

Furthermore, the present disclosure makes reference throughout to what are referred to herein as slow-moving subsystems (SMSSs) and fast-moving subsystems (FMSSs). It is expressly noted that, in some embodiments, one or more types of CCS—and in particular one or more types of VSS, such as cycling computers for example, are categorized as SMSSs regardless of their speed at a particular moment— perhaps among other factors, it is the physical vulnerability of an associated operator (e.g., cyclist) and/or passenger in the event of a collision that dictates that static categorization in some embodiments. On the flip side of that coin, in some embodiments, one or more types of CCS, such as VMSSs for example, are categorized as FMSSs regardless of their speed at a particular moment—perhaps among other factors, it is their potential for fast movement starting at any instant that dictates that static categorization in some embodiments.

Moreover, in some embodiments, some types of CCSs—and in, particular one or more types of NVSSs and most notably smartphones, though certainly many other examples could be listed, are categorized as being either SMSSs or FMSSs depending on how fast they are moving at a given moment, their average translational speed over an immediately preceding time frame, the particular path, of recent movement (e.g., along a highway, railroad tracks, or the like), a pairing (e.g., a BLUETOOTH® pairing) with an FMSS, and/or one or more other factors. At least some such NVSSs (e.g., smartphones) are very commonly carried (e.g., by hand, in a pocket, in a backpack, in a bag, in a purse, on a lap, on an adjacent seat in a car or train, etc.) by a person that may be in a car, on a train, riding a bicycle, or out for a walk or run, among innumerable other examples that could be listed here.

One embodiment takes the form of a method that includes collecting movement data pertaining to each subsystem in a plurality of subsystems. The plurality of subsystems includes one or both of one or more SMSSs and one or more FMSSs. The method also includes identifying, based at least in part on the collected movement data, an instance in which each warning-triggering condition in a set of warning-triggering conditions is true. The set of warning-triggering conditions includes (i) that a likelihood of a collision occurring among an identified subset of the plurality of subsystems is greater than a collision-probability threshold and (ii) that at least one of the subsystems in the identified subset has at least one current movement anomaly. The method also includes, responsive to identifying the instance, issuing at least one warning to at least one of the subsystems in the identified subset.

Another embodiment takes the form of a risk-assessment subsystem (RASS) that includes a communication interface, a processor, and data storage that contains instructions executable by the processor for carrying out the functions listed in the preceding paragraph. Still another embodiment takes the form of a computer-readable medium (CRM) containing instructions executable by a processor for carrying out at least those functions.

Furthermore, a number of variations and permutations of the above-listed embodiments is described herein, and it is expressly noted that any variation or permutation that is described in this disclosure can be implemented with respect to any type of embodiment. For example, a variation or permutation that is primarily described in connection with a method embodiment could just as well be implemented in connection with a system embodiment and/or a CRM embodiment. Furthermore, this flexibility and cross-applicability of embodiments is present in spite of any slightly different language (e.g., process, method, steps, functions, set(s) of functions, and/or the like) that is used to describe and/or characterize such embodiments.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION OF THE DRAWINGS

I. Introduction

Figure 1:
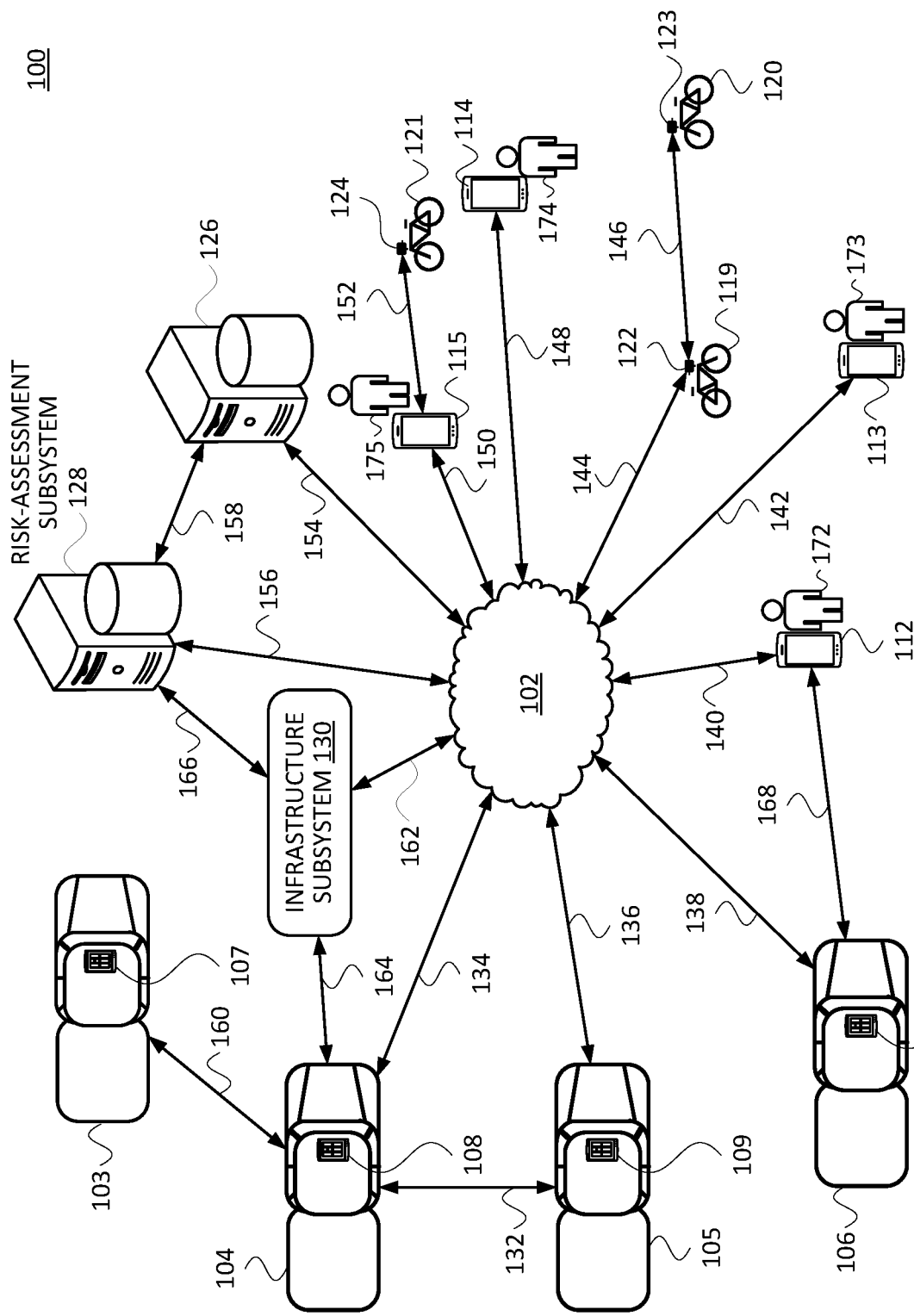
FIG. 1 is a diagram of an example communication context that includes an example communication network, multiple example vehicular subsystems (VSSs)—including both vehicle-mounted VSSs (VMVSSs) and non-vehicle-mounted VSSs (NVMVSSs), multiple example non-vehicular subsystems (NVSSs), an example risk-assessment subsystem (RASS), and an example infrastructure subsystem (ISS) in accordance with at least one embodiment.

To promote an understanding of the principles of the present disclosure, reference is made below to the embodiments that are illustrated in the drawings. The embodiments disclosed herein are not intended to be exhaustive or to limit the present disclosure to the precise forms that are disclosed in the following detailed description. Rather, the described embodiments have been selected so that others skilled in the art may utilize their teachings; accordingly, no limitation of the scope of the present disclosure is thereby intended.

In any instances in this disclosure—including in the claims—in which numeric modifiers such as first, second, and third are used in reference to components, data (e.g., values, identifiers, parameters, and/or the like), and/or any other elements, such use of numeric modifiers is not intended to denote or dictate any specific or required order of the so-referenced elements. Rather, any such use of numeric modifiers is intended solely to assist the reader in distinguishing any elements that are referenced in this manner from one another, and should not be interpreted as insisting upon any particular order or carrying any other significance, unless such an order or other significance is clearly and affirmatively explained herein.

In this disclosure, various components of various devices, systems, and the like are referred to as modules that carry out (i.e., perform, execute, and the like) various functions. As used in the present disclosure, a module includes both hardware and instructions. The hardware could include one or more processors, one or more microprocessors, one or more microcontrollers, one or more microchips, one or more application-specific integrated circuits (ASICs), one or more field programmable gate arrays (FPGAs), and/or one or more devices and/or components of any other type deemed suitable by those of skill in the art for a given implementation. The instructions are executable by the hardware for carrying out the one or more herein-described functions of the module, and could include hardware (i.e., hardwired) instructions, firmware, software, and/or the like, stored in any one or more non-transitory CRMs deemed suitable by those of skill in the art for a given implementation. Each such CRM could be or include memory (e.g., random access memory (RAM), read-only memory (ROM), erasable programmable read-only memory (EPROM), electrically erasable programmable read-only memory (EEPROM a.k.a. EPROM), flash memory, and/or one or more other types of memory) and/or one or more other types of non-transitory CRM. Any given module could be realized as a single component or be distributed across multiple components as deemed suitable by those of skill in the art.

Moreover, consistent with the fact that the entities and arrangements that are depicted in and described in connection with the drawings are presented as examples and not by way of limitation, any and all statements or other indications as to what a particular drawing "depicts," what a particular element or entity in a particular drawing "is" or "has," and any and all similar statements that are not explicitly self-qualifying by way of a clause such as "In at least one embodiment, . . . ", and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in the ensuing detailed description.

II. Example Architecture

A. Example Communication Context

FIG. 1 depicts a communication context 100 that includes a network 102, a vehicle 103 having a VMVSS 107, a vehicle 104 having a VMVSS 108, a vehicle 105 having a VMVSS 109, a vehicle 106 having a VMVSS 110, an NVSS 112 associated with a user 172 (i.e. and e.g., with a subscriber account associated with the user 172), an NVSS 113 associated with a user 173, an NVSS 114 associated with a user 174, an NVSS 115 associated with a user 175, an NVMVSS 122 associated with a bicycle 119, an NVMVSS 123 associated with a bicycle 120, an NVMVSS 124 associated with a bicycle 121, a network server 126, a RASS 128, an infrastructure subsystem (ISS) 130, and communication links having reference numerals corresponding to the even numbers between 132 and 168, inclusive. It should be understood that the communication context 100 and the entities depicted therein are presented by way of example and not limitation, and that innumerable other collections and arrangements of similar elements could be depicted.

The network 102 could include one or more communication networks of any type deemed suitable by those of skill in the art to accomplish the communications described herein. The network 102 could include one or more data-communication networks, one or more Internet-Protocol-(IP)-based networks such as the Internet, one or more public networks, one or more private networks, one or more wired-communication (e.g., Ethernet, fiber optics, and/or the like) networks, one or more wireless-communication (e.g., Wi-Fi, LTE, and/or the like) networks, one or more satellite networks, one or more cellular networks, one or more telephone networks, one or more local area networks (LANs), one or more wide area networks (WANs) such as one or more wireless wide area networks (WWANs), and/or one or more networks of any other type.

The vehicles 103-106 are all depicted using a common icon, and could all be the same type of vehicle but could instead include two or more different types of vehicles. And while the four vehicles 103-106 are depicted, any number could be present in any given context. Any one or more of the vehicles 103-106 could be a car, a truck, a train, a boat, a plane, and/or any other type of vehicle. Moreover, each of the vehicles 103-106 is depicted as having a respective one of the VMVSSs 107-110. Any one or more of the VMVSSs 107-110 could be an on-board CCS that is manufactured integrally with its respective one of the vehicles 103-106. An example one of the VMVSSs 107-110 is described in connection with FIG. 2.

Similar to the vehicles 103-106, the bicycles 119-121 are all depicted using a common icon, and could all be the same type of bicycle but could instead include two or more different types of bicycles. In general, in FIG. 1, the bicycles 119-121 represent a class of vehicles that are generally powered only—or substantially only—by human effort and that generally do not offer much protection to their operator in the case of an accident, a fall, a collision, and/or the like. Each of the bicycles 119-121 is associated with a respective one of the NVMVSSs 122-124, each of which could be a device such as a cycling computer that is removably attachable to its respective bicycle. An example one of the NVMVSSs 122-124 is described in connection with FIG. 3.

The NVSSs 112-115 could each be a smartphone that is carried by its respective associated one of the users 172-175. The NVSSs 112-115 could each be the same type of NVSS (e.g., the same type of smartphone), or instead the NVSSs 112-115 could include two or more different types of NVSSs (e.g., smartphones, cell phones, wearables, etc.). An example one of the NVSSs 112-115 is described in connection with FIG. 4. Moreover, the example architecture of the example NVSS that is depicted in and described in connection with FIG. 4 could more generically be considered an example architecture of a CCS as well.

One or both of the network server 126 and the RASS 128 could take the form of a single server or system of servers, each of which includes at least one communication interface, at least one processor, and data storage—whether centralized or dispersed—that contains instructions executable by the respective at least one processor for carrying out the functions described herein as being carried out in one or more embodiments by one or both of the network server 126 and the RASS 128. An example architecture for the RASS 128 is described in connection with FIG. 5, and it is noted that the network server 126 in at least one embodiment has an architecture similar to the architecture that is described with respect to the RASS 128 in connection with FIG. 5.

The ISS 130 could include any computing and communication hardware, as well as any cameras or other sensors, to enable the ISS 130 to carry out the IS S-related functions described herein. The ISS 130 could be positioned at an intersection of two or more streets, near a blind corner, or at any other location deemed suitable for a given implementation. In many embodiments, the ISS 130 has a fixed location, though that is by way of example and not limitation. The ISS 130 could be mobile, such as would be the case in an implementation of the ISS 130 as a drone, an autonomous vehicle, a weather balloon, a satellite, a buoy, and/or one or more other possibilities.

Each of the communication links 132-168 could be or include one or more wired-communication links (using, e.g., Ethernet, USB, and/or the like) and/or could be or include one or more wireless-communication links (using, e.g., Wi-Fi, BLUETOOTH®, LTE, dedicated short-range communications (DSRC), and/or the like). In the communication context 100 that is depicted by way of example in FIG. 1, the communication links 160, 132, and 146 are V2V links, which could operate as DSRC communications, as an example. In some embodiments, the VMVSS 107, the VMVSS 108, the VMVSS 109, the NVMVSS 122, the NVMVSS 123, and/or one or more other subsystems operate as mesh-network nodes in a mesh-network topology.

In the communication context 100 that is depicted in FIG. 1 by way of example, the communication link 164 is a V2I link, while the communication link 152 and the communication link 168 are V2P links. In general, any one or more of the communication links 132-168 could be a point-to-point (P2P) link or span one or more intermediary devices, switches, routers, bridges, relays, and/or the like. Moreover, one or more of the communication links 132-168 (such as, e.g., the communication link 158 and the communication link 166) could be virtual links, perhaps involving one or more tunneling (e.g., virtual private network (VPN)) connections or the like.

B. Example Vehicle-Mounted Vehicular Subsystem (VMVSS)

Figure 2:
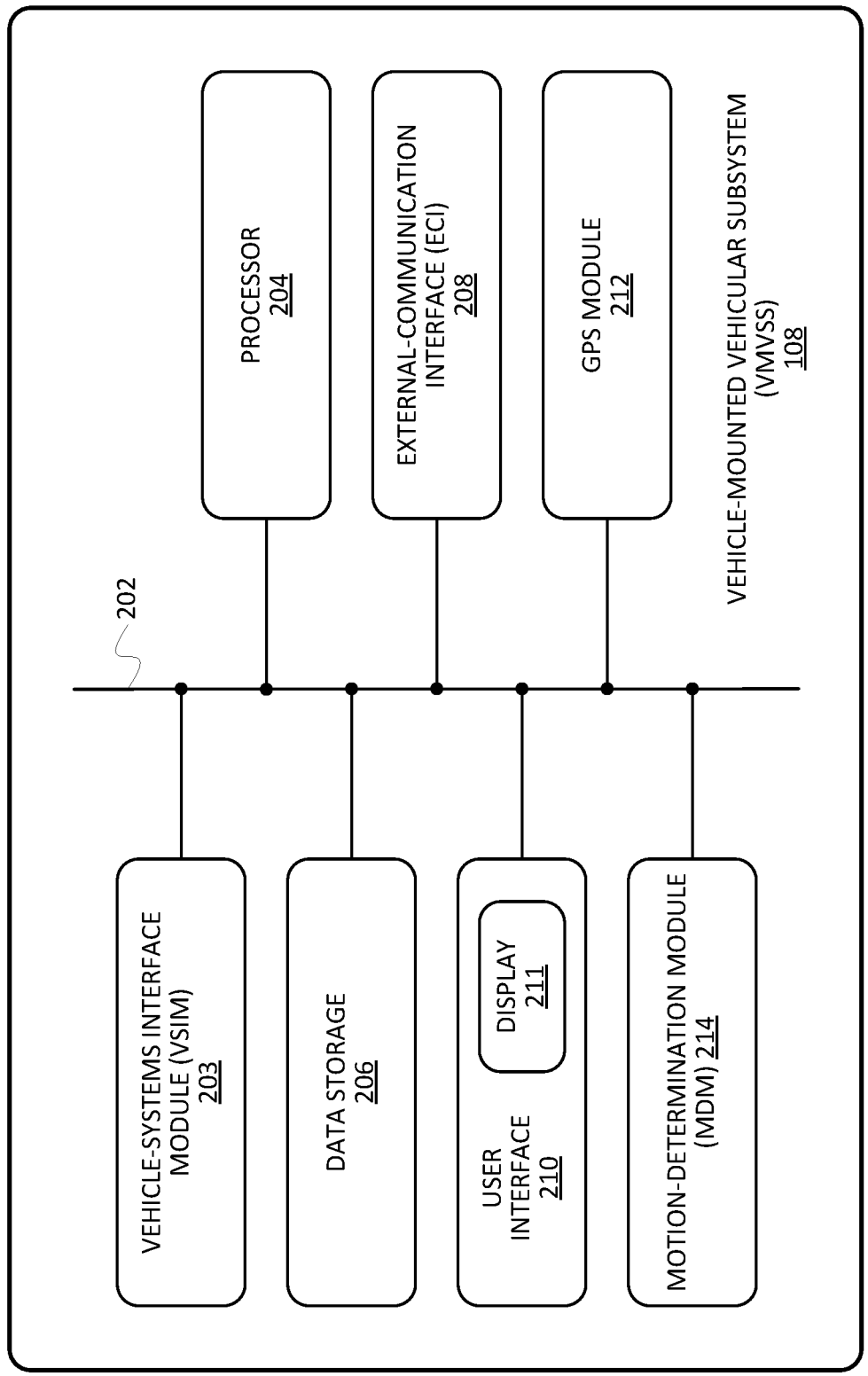
FIG. 2 is a diagram of an example architecture of an example one of the VMVSSs of FIG. 1 in accordance with at least one embodiment.

FIG. 2 depicts an example simplified architecture of the VMVSS 108 as an example one of the VMVSSs 107-110. Each of the VMVSSs 107-110 could have an architecture similar to the architecture described herein with respect to the VMVSS 108. In the embodiment that is depicted in FIG. 2, the VMVSS 108 includes a subsystem bus 202 that communicatively interconnects a vehicle-systems-interface module (VSIM) 203, a processor 204, data storage 206, an external-communication interface (ECI) 208, a user interface 210 that includes a display 211, a GPS module 212, and a motion-determination module (MDM) 214.

The VSIM 203 includes one or more wired-communication interfaces and/or one or more wireless-communication interfaces operable to exchange data with one or more onboard systems of the vehicle 104. With respect to particular systems, components, and/or the like of the vehicle 104 with which the VSIM 203 exchanges data during operation, some examples include an on-board diagnostics (OBD) systems, engine control modules (ECMs), power control modules (PCMs), electronic control units (ECUs), and the like.

The processor 204 could be a general-purpose microprocessor such as a central processing unit (CPU), and the data storage 206 could be any suitable non-transitory CRM— such as ROM, RAM, flash memory, a solid-state drive, and/or the like—that contains instructions executable by the processor 204 for carrying out the VMVSS functions described herein. The ECI 208 includes one or more components such as Ethernet cards, USB ports, and/or the like for wired communication and/or one or more components such as Wi-Fi transceivers, LTE transceivers, DSRC transceivers, BLUETOOTH® transceivers, and/or the like for wireless communication such as uplink and downlink communication with a terrestrial WWAN such as an LTE network, V2V communication with one or more other VMVSSs of one or more other vehicles, and/or the like. The user interface 210 includes one or more user-input components such as a touchscreen, buttons, a keyboard, a microphone, and/or the like, as well as one or more output components such as the display 211 (which could be the aforementioned touchscreen), speakers. LEDs, and/or the like.

The GPS module 212 contains dedicated hardware and instructions for using received GPS ephemeris data to determine a current location of the vehicle 104, perhaps with assistance from one or more terrestrial networks. In some embodiments, the VMVSS 108 has a location-determination unit that utilizes a location-determination technology other than GPS. The ECI 208, or perhaps another component of the VMVSS 108, could also include a location-determination module such as a global positioning system (GPS) receiver.

The MDM 214 may receive location data from the GPS module 212 as well as motion-related parameters such as speed, acceleration, and/or the like from the VSIM 203, and may compute movement vectors reflective of a current speed and heading of the vehicle 104. The MDM 214 may transmit these computed movement vectors as well as one or more other calculated movement-related values via the subsystem bus 202 to the processor 204 for further computation, to the ECI 208 to be transmitted to one or more other vehicles, one or more other networks, an ISS such as the ISS 130, one or more VMVSSs, one or more NVMVSSs, one or more NVSSs, and/or one or more other recipients of any other type or types. In some embodiments, the MDM 214 performs movement-related calculations reflective of the movement of one or more other vehicles or other entities, including those that do not have sufficient processing resources for such calculations, or perhaps no processing resources at all.

C. Example Non-Vehicle-Mounted Vehicular Subsystem (NVMVSS)

Figure 3:
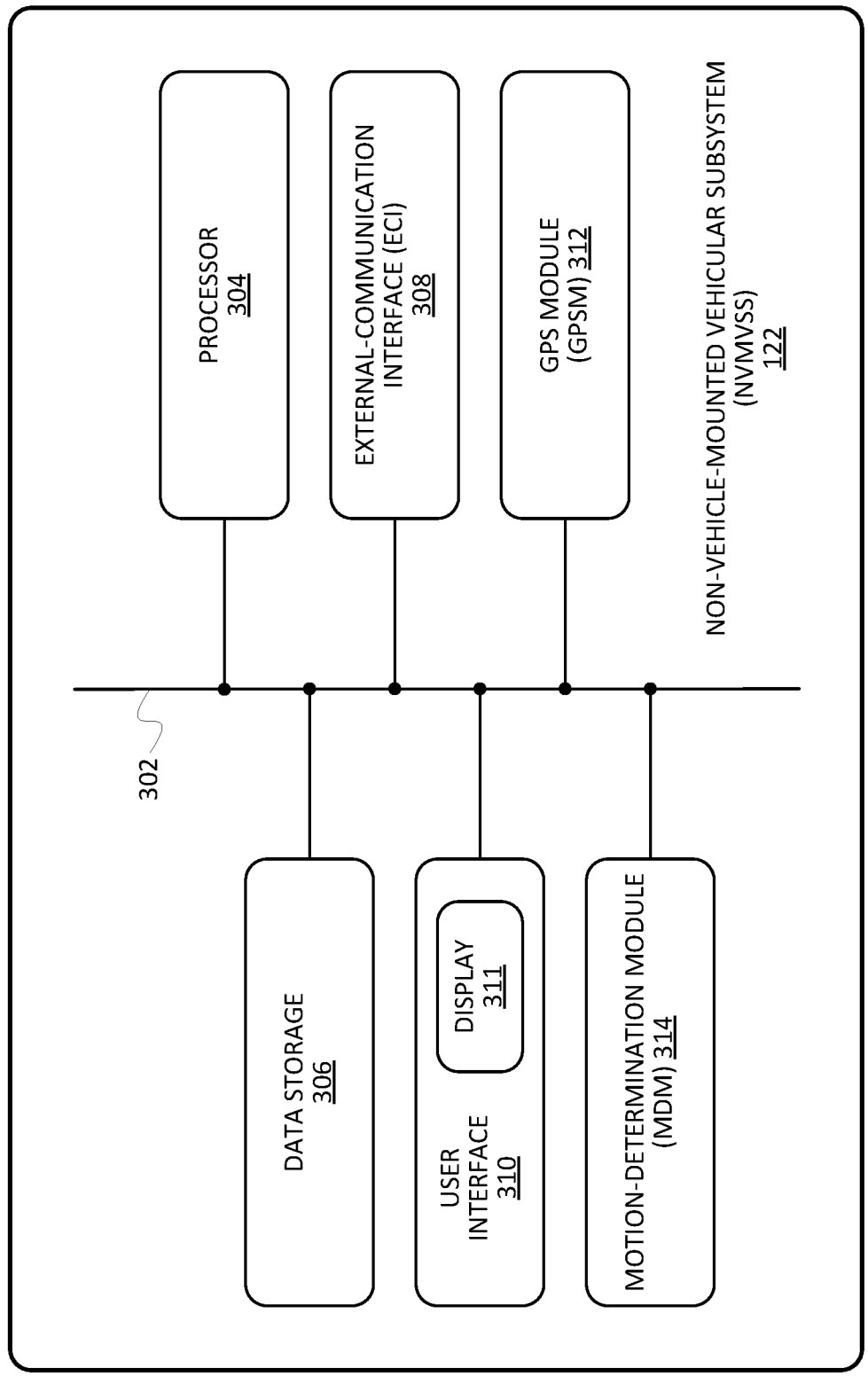
FIG. 3 is a diagram of an example architecture of an example one of the NVMVSSs of FIG. 1 in accordance with at least one embodiment.

FIG. 3 depicts an example architecture of the NVMVSS 122 as an example one of the NVMVSSs 122-124. Each of the NVMVSSs 122-124 could have an architecture similar to the architecture described herein with respect to the NVMVSS 122. In the embodiment that is depicted in FIG. 3, the NVMVSS 122 includes a subsystem bus 302 that communicatively interconnects a processor 304, data storage 306, an ECI 308, a user interface 310 that includes a display 311, a GPS module 312, and an MDM 314.

The example architecture of the NVMVSS 122 that is depicted in FIG. 3 is similar in many respects to the example architecture of the VMVSS 108 that is depicted in and described in connection with FIG. 2, and therefore is not described in as great of detail. Among the notable differences are that the NVMVSS does not comprise a VSIM. Indeed, the NVMVSS 122 may be utilized on a vehicle such as the bicycle 119 that has no system with which the NVMVSS 122 could interface. In an embodiment, the NVMVSS 122 is a cycling computer that is removably attachable to a vehicle such as the bicycle 119. In other embodiments, the NVMVSS 122 has a VSIM for interfacing with electromechanical sensors such as a revolution counter that itself is mounted on one or both tires of the bicycle 119. Unlike the MDM 214, the MDM 314 would not receive vehicle-movement parameters from a VSIM, but instead may calculate values such as speed and acceleration using changing location over time, wheel revolutions, and/or one or more other methods. In some embodiments, the NVMVSS 122 is communicatively coupled with a warning device such as a light, a horn, and/or the like that is also mounted on the bicycle 119.

D. Example Non-Vehicular Subsystem (NVSS)

Figure 4:
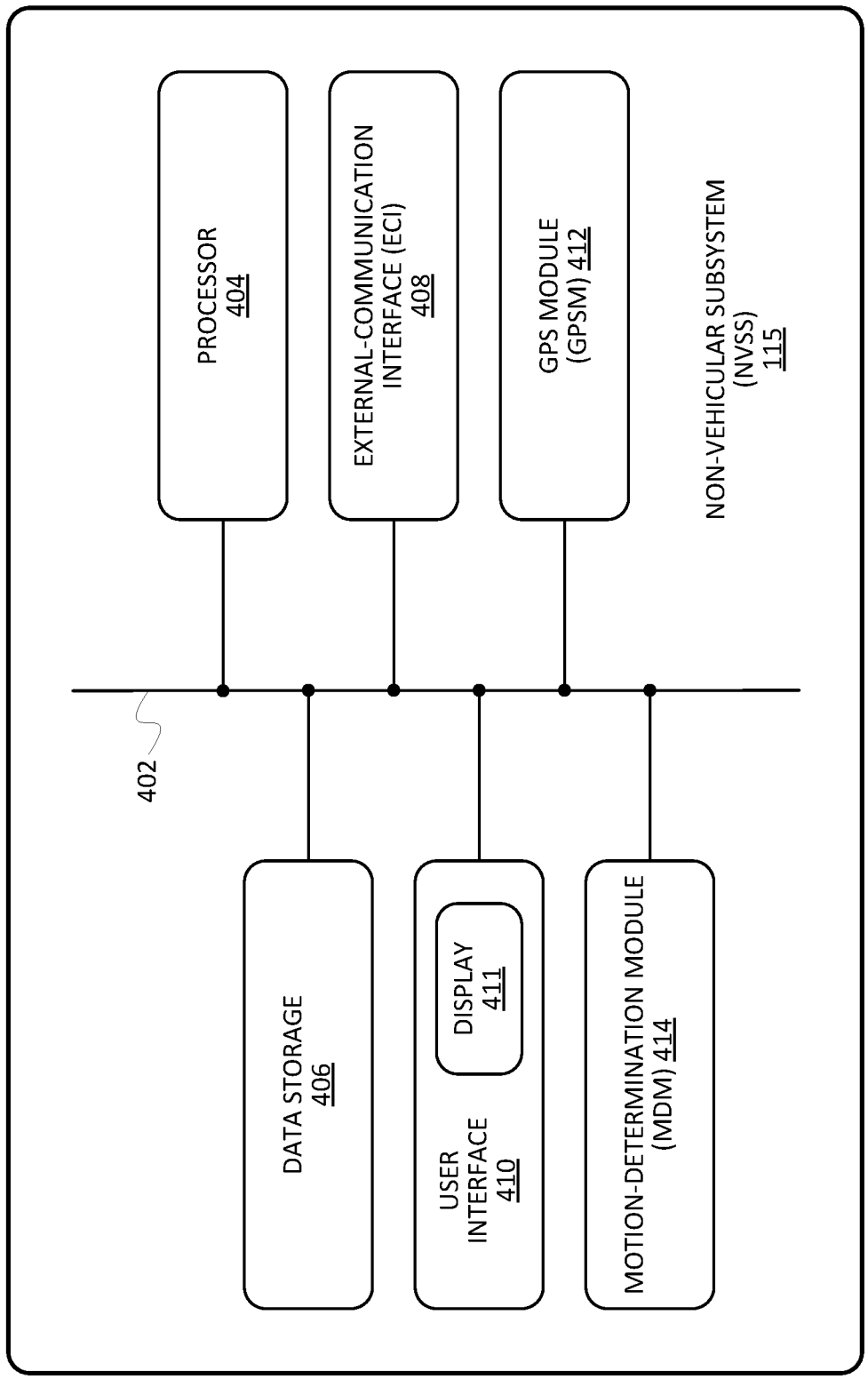
FIG. 4 is a diagram of an example architecture of an example one the NVSSs of FIG. 1 in accordance with at least one embodiment.

FIG. 4 depicts an example architecture of the NVSS 115 as an example one the NVSSs 112-115. Each of the NVSSs 112-115 could have an architecture similar to the architecture described herein with respect to the NVSS 115. In the embodiment that is depicted in FIG. 4, the NVSS 115 includes a subsystem bus 402 that communicatively interconnects a processor 404, data storage 406, an ECI 408, a user interface 410 that includes a display 411, a GPS module 412, and an MDM 414.

The example architecture of the NVSS 115 that is depicted in FIG. 4 is similar in many respects to the example architectures that are depicted in and described in connection with FIG. 2 and FIG. 3, and therefore is not described in as great of detail. In an embodiment, the NVSS 115 is a smartphone and therefore the various components such as the ECI 408 and the user interface 410 correspondingly take the form of a typical smartphone ECI (including, e.g., Wi-Fi and LTE capabilities) and smartphone user interface (including, e.g., a touchscreen as or as at least part of the 411). As described above, the NVSS 115 could be either an SMSS or an FMSS depending on the particular circumstances at any given moment. In some situations, the NVSS 115 is communicatively coupled (via, e.g., BLUETOOTH®) to a vehicle to project sound through the vehicle's sound system or to display visual warnings via a display of the vehicle.

E. Example Risk-Assessment Subsystem (RASS)

Figure 5:
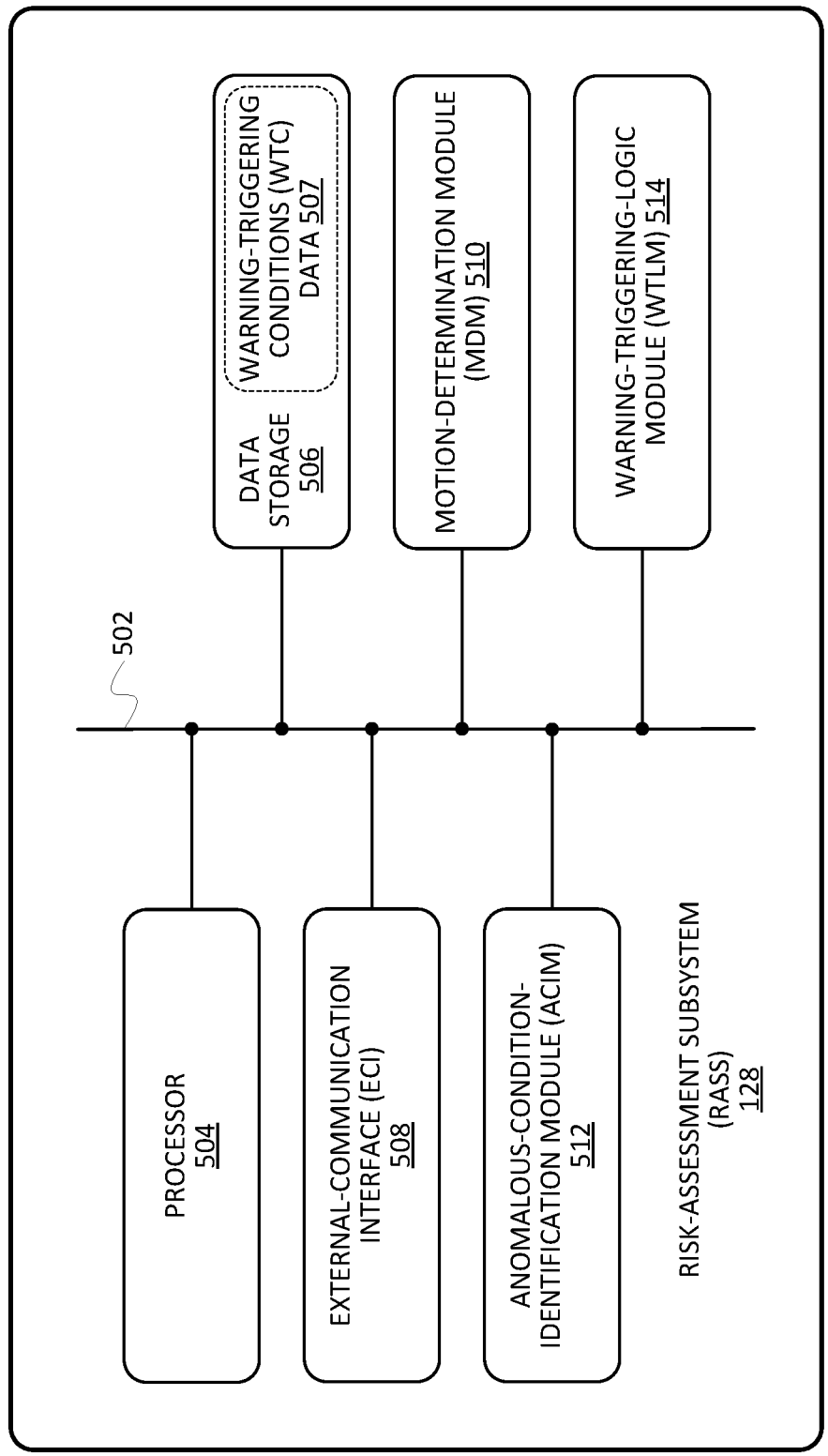
FIG. 5 is a diagram of an example architecture of the example RASS of FIG. 1 in accordance with at least one embodiment.

FIG. 5 depicts an example architecture of the RASS 128 as including a subsystem bus 502 that communicatively interconnects a processor 504, a data storage 506 that contains warning-triggering-conditions (WTC) data 507, an ECI 508, an MDM 510, an anomalous-condition-identification module (ACIM) 512, and a warning-triggering-logic module (WTLM) 514. Similar to the above descriptions of FIG. 2, FIG. 3, and FIG. 4, components—such as the processor 504, the data storage 506, and the ECI 508—that are similar to above-described components are not described here in as great of detail.

The MDM 510 contains similar logic for computing motion vectors and the like as are contained in, e.g., the MDM 214 of the VMVSS 108. The RASS 128 uses the MDM 510 in some embodiments to compute motion vectors, predict locations at certain times, and perform other mathematical, motion-related calculations with respect to one or more subsystems—i.e., with respect to one or more VMVSSs, one or more NVMVSSs, one or more NVSSs, and/or the like. The MDM 510 may receive movement vectors and/or other movement data from and/or reflective of the movement of one or more subsystems. As discussed herein, such subsystems could include at any given time one or more slow-moving subsystems and/or one or more fast-moving subsystems. Moreover, the MDM 510 processes the results of such calculations to determine whether a likelihood of a collision occurring among an identified group of two or more such subsystems is greater than a collision-probability threshold, and to output this result to the processor 504, the ACIM 512, the WTLM 514, and/or one or more other entities of the RASS 128. Such an identified group is referred to herein at times as an "identified subset."

The ACIM 512 contains logic for determining whether at least one subsystem in an identified subset has (i.e., is exhibiting or has due to current weather conditions, as but two examples) at least one of what is referred to herein as a current movement anomaly. Numerous examples of what qualifies in various different embodiments as a current movement anomaly are discussed elsewhere in this disclosure. Upon making a determination in the affirmative—i.e., that at least one subsystem in an identified subset has a current movement anomaly, the ACIM 512 outputs this result to the processor 504, the WTLM 514, and/or one or more other components of the RASS 128.

The WTLM 514 contains logic for determining whether or not to issue (i.e., send, present, and/or the like) one or more warnings to one or more subsystems. In some embodiments, that logic is relatively simple: if the WTLM 514 receives both (i) a CRASH and (ii) an ANOMALY, the WTLM issues one or more warnings to one or more subsystems. In other embodiments, the WTLM 514 imposes one or more warning-triggering conditions in addition to those two. Many examples of warning-triggering conditions are described in this disclosure.

Moreover, it should be expressly understood that any one or more of the MDM 510, the ACIM 512, and the WTLM 514 could be functional modules executing on the processor 504. One or more of them could instead be physically separate processing modules as depicted in FIG. 5. Such is also the case with the other modules described above in connection with FIG. 2, FIG. 3, and FIG. 4. In some embodiments, the RASS 128 offloads certain processing functions for one or more of the MDM 510, the ACIM 512, and/or the WTLM 514 to another server such as the network server 126. Moreover, in some embodiment, in addition to motion data received from one or more subsystems, the RASS 128 may also receive zone data from infrastructure subsystems such as the ISS 130 for use in processing by one or more of the functional modules of the RASS 128. Also, in some embodiments, the RASS 128 is realized as a functional module of one or more of the subsystems whose movements it is analyzing. For example, the RASS 128 could be embodied as a functional module of a VMVSS or an ISS, as examples.

F. Example Infrastructure Subsystem (ISS)

Figure 6:
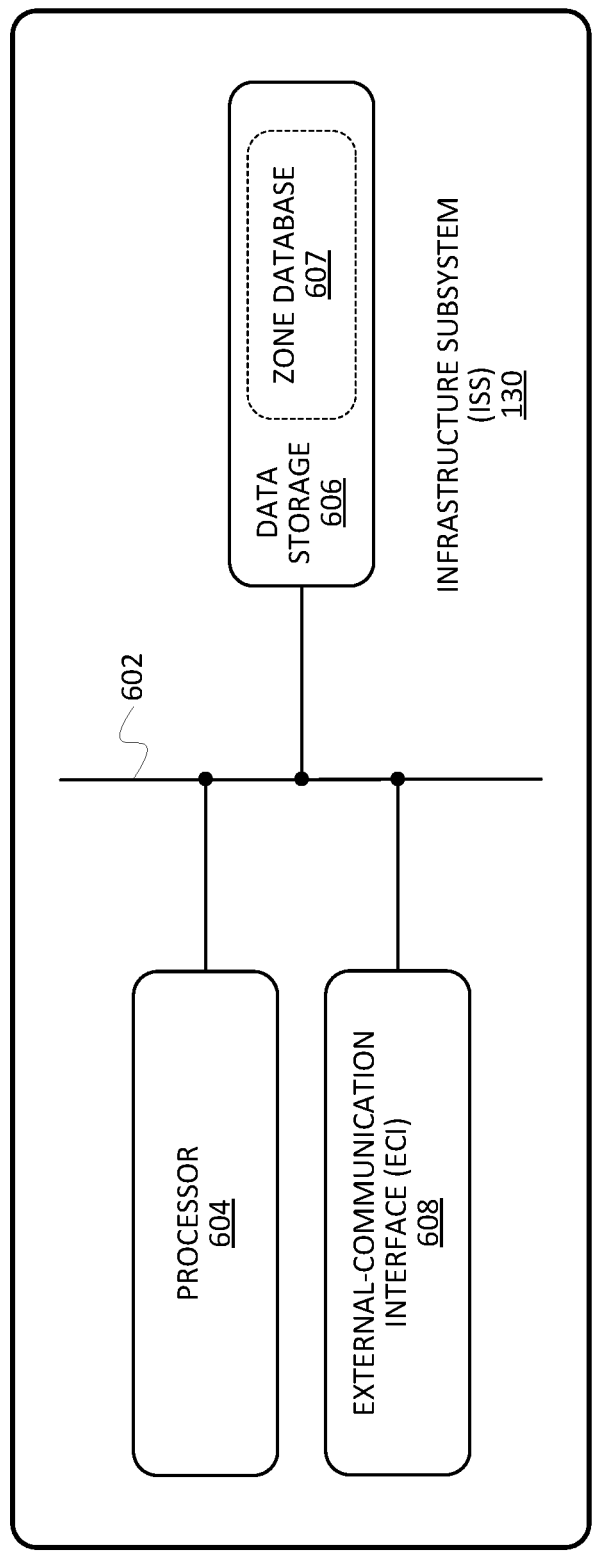
FIG. 6 is a diagram of an example architecture of the example ISS of FIG. 1 in accordance with at least one embodiment.

FIG. 6 depicts an example architecture of the ISS 130 as including a subsystem bus 602 that communicatively interconnects a processor 604, a data storage 606 that contains a zone database 607, and an ECI 608. Similar to the above descriptions of FIG. 3, FIG. 4, and FIG. 5, components—such as the processor 604, the data storage 606, and the ECI 608—that are similar to above-described components are not described here in as great of detail. In various different embodiments, the ISS 130 maintains the zone database 607, transmits zone data from the zone database 607 to one or more other entities, receives updates to the zone database 607, bridges communications between subsystems (e.g., between VSSs and NVSSs), and/or performs one or more other functions deemed suitable by those of skill in the relevant art in a given context and/or for a given implementation. The ISS 130 may be stationary or mobile as described above, and may be equipped with one or more cameras and/or other sensors for gathering any data deemed suitable by those of skill in the relevant art.

G. Example Distribution of Functions

Figure 7:
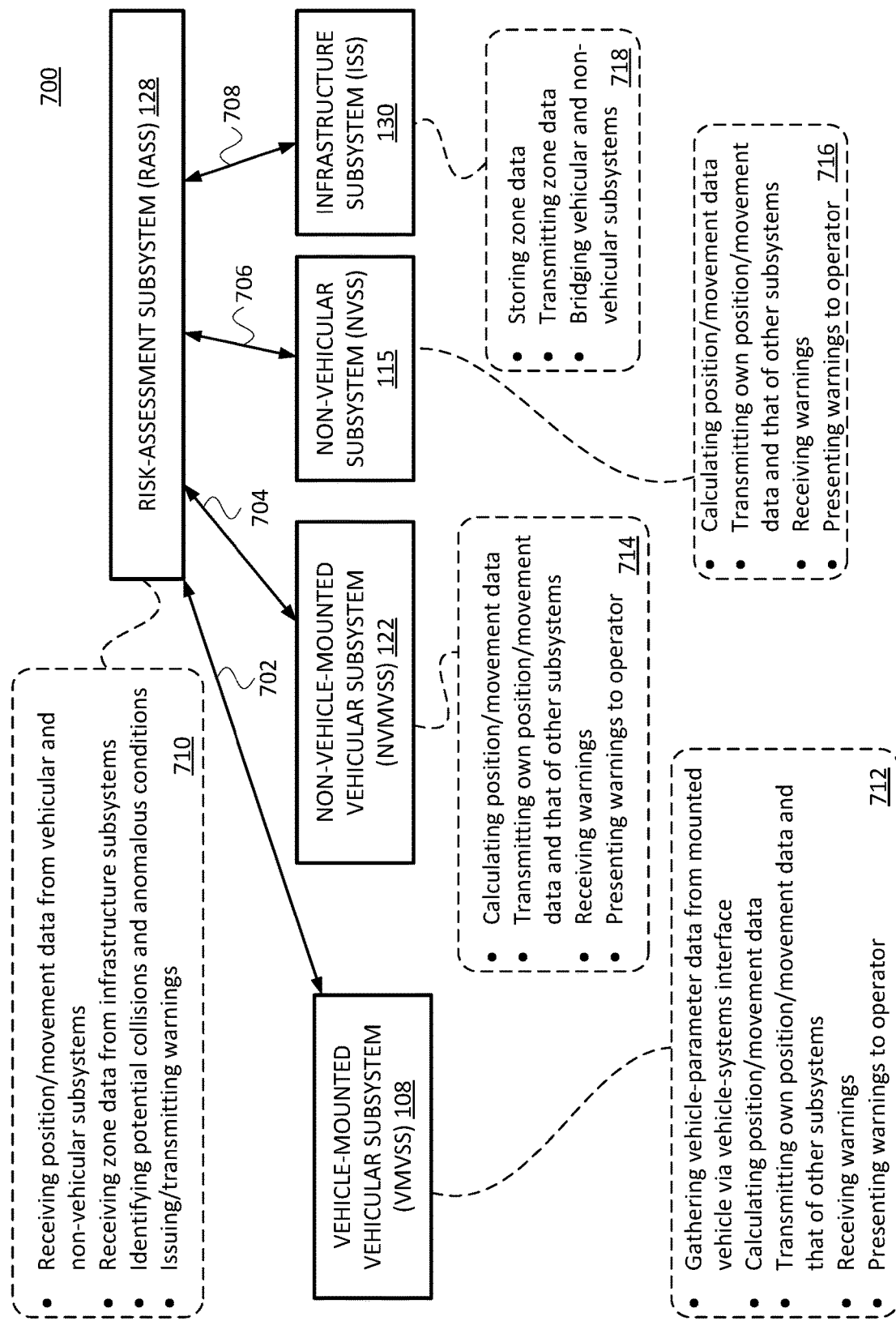
FIG. 7 is a diagram of an example distribution of functions among the example VMVSS of FIG. 2, the example NVMVSS of FIG. 3, the example NVSS of FIG. 4, the example RASS of FIG. 5, and the example ISS of FIG. 6 in accordance with at least one embodiment.

FIG. 7 is a diagram of an example distribution 700 of functions among the VMVSS 108, the NVSS 115, the NVMVSS 122, the RASS 128, and the ISS 130. As depicted in FIG. 7, the RASS 128 is communicatively connected to the VMVSS 108 via a communication link 702, to the N 122 via a communication link 704, to the NVSS 115 via a communication link 706, and to the ISS 130 via a communication link 708.

Each of the communication links 702-708 could be or include one or a sequence of more than one of the networks, entities, communication links, and/or the like described herein. For example, the communication link 702 could in some instances take the path formed by the communication link 156, the network 102, and the communication link 134, while in other instances the communication link 702 could take the path formed by the communication link 166, the I 130, and the communication link 164. A number of other possibilities could be listed here as well and will occur to those of skill in the relevant art with the benefit of this disclosure. Similar examples could be given here with respect to each of the communication links 704-708. In this sense, each of the communication links could be thought of as being logical or virtual communication links, though of course one or more of these communication links could be direct, physical communication links as well.

Moreover, each of the subsystems that are depicted in FIG. 7 are shown in association with a numbered box of examples of functions carried out by the respective entities in one or more embodiments. The RASS 128 is shown in association with a box 710 in which the listed example functions carried out by the RASS 128 in accordance with one or more embodiments are (i) receiving position/movement data from vehicular and non-vehicular subsystems; (ii) receiving zone data from infrastructure subsystems; (iii) identifying potential collisions and anomalous conditions; and (iv) issuing/transmitting warnings.

The VMVSS 108 is shown in association with a box 712 in which the listed example functions carried out by the VMVSS 108 in accordance with one or more embodiments are (i) gathering vehicle-parameter data from the mounted vehicle (i.e., the vehicle 104) via a vehicle-systems interface (i.e., via the VSIM 203); (ii) calculating position/movement data (for itself and/or for one or more other subsystems); (iii) transmitting position/movement data (for itself and/or for one or more other subsystems); (iv) receiving warnings; and (v) presenting warnings to its operator. The NVMVSS 122 is shown in association with a box 714 in which the listed example functions carried out by the NVMVSS 122 in accordance with one or more embodiments are (i) calculating position/movement data (for itself and/or for one or more other subsystems); (ii) transmitting position/movement data (for itself and/or for one or more other subsystems); (iii) receiving warnings; and (iv) presenting warnings to its operator.

The NVSS 115 is shown in association with a box 716 in which the listed example functions carried out by the NVSS 115 in accordance with one or more embodiments are (i) calculating position/movement data (for itself and/or for one or more other subsystems); (ii) transmitting position/movement data (for itself and/or for one or more other subsystems); (iii) receiving warnings; and (iv) presenting warnings to its operator. Finally, the ISS 130 is shown in association with a box 718 in which the listed example functions carried out by the ISS 130 in accordance with one or more embodiments are (i) storing zone data; (ii) transmitting zone data; and (iii) bridging vehicular and non-vehicular subsystems.

III. Example Operation

Figure 8:
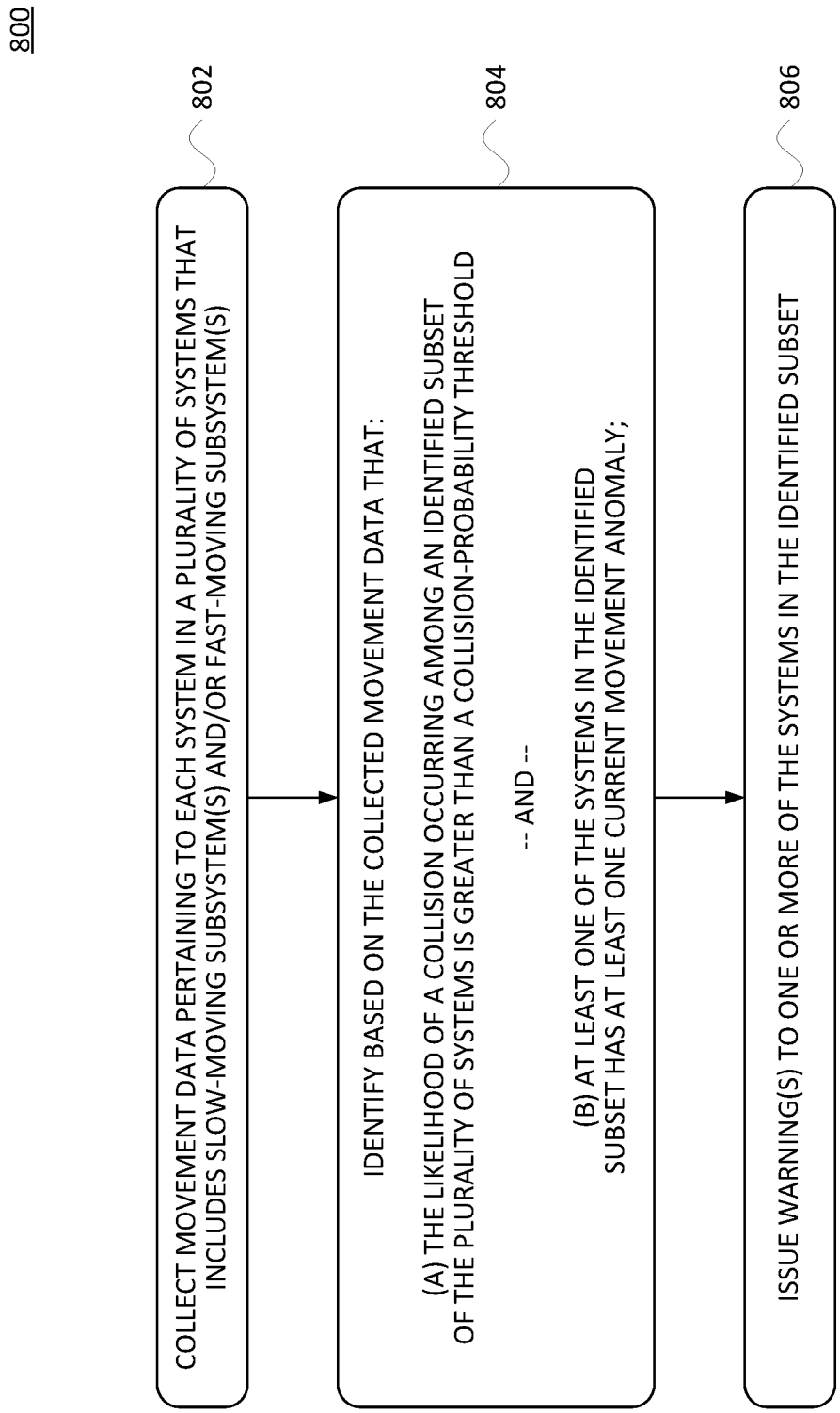
FIG. 8 is a flowchart of an example method in accordance with at least one embodiment.

FIG. 8 is a flowchart of an example method 800 that, in some embodiments (including the embodiments that are described below in connection with at least FIG. 8), is carried out by the RASS 128. In other embodiments, the method 800 is carried out by one or more other entities either alone or in combination. In some embodiment, the method 800 is carried out by the RASS 128 in combination with one or more other entities. In some embodiments in which the RASS 128 is embodied within one of the slow-moving subsystems and/or one of the fast-moving subsystems, the method 800 can be carried out entirely by a single one of those subsystems (i.e., collecting and analyzing its own movement data, identifying a potential collision and at least one current movement anomaly, and presenting a warning via its own user interface); in other embodiments, a single subsystem may carry out all of those functions and also issue warnings to one or more subsystems other than itself; and certainly many other permutations could be listed here.

Briefly, before expounding further on each of the three steps, the method 800 includes:

Step 802, at which the RASS 128 collects movement data pertaining to each subsystem in a plurality of subsystems, where that plurality of subsystems includes one or more slow-moving subsystems and/or one or more fast-moving subsystems;

Step 804, at which the RASS 128 identifies, based at least in part on the movement data collected at step 802, an instance in which each warning-triggering condition in a set of warning-triggering conditions is true. The set of warning-triggering conditions includes:

Condition 804A: a likelihood of a collision occurring among an identified subset of the plurality of subsystems being greater than a collision-probability threshold; and Condition 804B: at least one of the subsystems in the identified subset having at least one current movement anomaly; and Step 806, at which, responsive to identifying the instance in step 804, issuing at least one warning to at least one of the subsystems in the identified subset.

At step 802, the RASS 128 collects movement data pertaining to each subsystem in a plurality of subsystems, where the plurality of subsystems includes one or more slow-moving subsystems and/or one or more fast-moving subsystems. Although bright lines may be difficult to draw to separate slow-moving subsystems from fast-moving subsystems, in general slow-moving subsystems as a category includes those that correspond to people that are either not using a vehicle at all (e.g., jogging) and those that correspond to people using vehicles such as skateboards that move quite slowly relative to the speed at which fast-moving subsystems typically move as well as vehicles such as bicycles that, though they may compare quite favorably with automobiles with respect to their speed of motion in many instances, their operators are typically quite vulnerable to serious injury or worse in the case of falls, accidents, collisions, and/or the like. The slow-moving subsystems themselves may either be NVSSs carried by the people or NVMVSSs that may be at least temporarily associated with (e.g., removably mounted to) such vehicles.

Any given slow-moving subsystem could be a mobile device that is carried by or with a pedestrian (e.g., a walker, a runner, and/or the like), a bicyclist, a rollerskater, a rollerblader, a skateboarder, a canoer, a kayaker, someone operating a hang glider, someone operating a scooter such as a Segway®, and/or the like. A slow-moving subsystem could be associated with a particular person (e.g., a mobile subscriber) that happens to be engaging in such an activity or mode of transportation, but could just as well be an NVMVSS that is associated with a particular vehicle (e.g., bicycle, scooter, moped, jet ski, hot air balloon, pair of skates, skateboard, etc.) that a particular user or users happen to be using at the moment. A given slow-moving subsystem could be or include a smart phone, a cell phone, a wearable (e.g., a smartwatch, a step-counting device or other fitness device, smart glasses, and/or the like). A given slow-moving subsystem could be any combination of one or more of the aforementioned examples. In general, a slow-moving subsystem could be or include any CCD that is suitably equipped, programmed, and configured to carry out one or more of the slow-moving-subsystem functions described herein.

On the other hand, as a general matter, fast-moving subsystems as a category includes those subsystems that are either permanently associated with (e.g., integral to) or semi-permanently associated with (e.g., removably mounted to) vehicles that are capable of fast movement and that generally offer their operators a greater degree of physical, structural protection than do typical slow-moving subsystems. Thus, VMVSSs would typically be categorized as fast-moving subsystems for the purposes of the present disclosure, as would any NVMVSSs that happen to be associated at a given time with such a vehicle. Moreover, fast-moving subsystems as a category also includes NVSSs that are carried by people that happen to be operating or riding in such a vehicle. Some examples of such vehicles include cars, trucks, vans, motorcycles, trains, speedboats, hovercrafts, airplanes, drones, and the like.

A given fast-moving subsystem could be any combination of two or more of the aforementioned fast-moving-subsystem examples. As a general matter, a fast-moving subsystem could be or include any CCD that is suitably equipped, programmed, and configured to carry out one or more of the fast-moving-subsystem functions described herein. Those of skill in the relevant art having the benefit of this disclosure will appreciate that a given CCD could be a slow-moving subsystem in some scenarios and a fast-moving subsystem in others. As but one example, a given smart phone in the pocket of a pedestrian would be a slow-moving subsystem at that time whereas that same smart phone would become a fast-moving subsystem if that pedestrian got into a car and started driving or riding. And clearly any number of other such examples could be listed here.

With respect to the movement data collected at step 802, that data could reflect one or more of position, positional accuracy, location, latitude, longitude, elevation, speed, acceleration, trajectory, transmission state, heading, steering-wheel angle, vehicle type, vehicle size, surface coefficient of friction, weather, temperature, precipitation, recent degree of active status of a traction-control system, recent degree of active status of an antilock braking system (ABS), and exterior-lights status.

In an embodiment, collecting the movement data involves receiving at least one basic safety message (BSM). As known in the art, the typical transmission range for a BSM is on the order of 1 kilometer. A first component of a BSM is typically known as "Part 1," is transmitted on the order of 10 times per second, and typically includes values such as position, latitude, longitude, elevation, positional accuracy, motion (including transmission state, speed, and heading), steering-wheel angle, acceleration set (4-way) {x, y, z, yaw}, and vehicle size. A second component of a BSM is typically known as "Part 2," is transmitted less frequently than is Part 1, and typically includes values such as road coefficient of friction, rain/precipitation sensor reading, traction control system: active over previous 100 milliseconds (msec), ABS: active over previous 100 msec, lights changed and exterior lights status, wipers changed and wiper status, ambient air temperature, ambient air pressure, and vehicle type.

At step 804, the RASS 128 identifies, based at least in part on the movement data collected at step 802, an instance in which each warning-triggering condition in a set of warning-triggering conditions is true. The set of warning-triggering conditions includes at least the following two conditions: (A) that a likelihood of a collision occurring among an identified subset of the plurality of subsystems is greater than a collision-probability threshold and (B) that at least one of the subsystems in the identified subset has at least one current movement anomaly. As denoted above, the former is referred to herein at times as condition 804A and the latter is referred to herein at times as condition 804B.

With respect to condition 804A—i.e., that a likelihood of a collision occurring among an identified subset of the plurality of subsystems is greater than a collision-probability threshold, the identified subset includes two or more subsystems, any one of which could be either a slow-moving subsystem or a fast-moving subsystem. A given slow-moving system could be either a VSS or an NVSS. A given slow-moving system could be categorized as such based at least in part on a current and/or recent movement characteristic. A given fast-moving subsystem could be either a VSS or an NVSS. A given fast-moving subsystem could be categorized as such based at least in part on a current and/or recent movement characteristic.

In an embodiment, the RASS 128 receives a message containing the likelihood of a collision occurring among an identified subset of the plurality of subsystems. In another embodiment, the RASS 128 calculates the likelihood of a collision occurring among an identified subset of the plurality of subsystems based on a set of one or more collision criteria. In an embodiment, the set of collision criteria includes location and trajectory of the subsystems in the identified subset. In an embodiment, the RASS 128 identifies that the likelihood of a collision occurring among an identified subset of the plurality of subsystems is greater than the collision-probability threshold by receiving a message indicating that that is the case. In some embodiments, the RASS 128 selects a value for the collision-probability threshold based at least in part on a current time of day, a terrain characteristic (e.g., a topological characteristic (e.g., hills, curves, etc.), an accident rate, and/or the like), a weather condition, and/or one or more other factors.

With respect to condition 804B—i.e., that at least one of the subsystems in the identified subset has at least one current movement anomaly, examples of current movement anomalies include a movement pattern indicative of distractedness, a movement pattern indicative of tiredness, an erratic movement pattern, excessive speed (a data model could involve inputting data such as location and trajectory parameters into a module that includes data that reflects applicable traffic rules), insufficient speed, excessive swerving, excessive acceleration, excessive deceleration, active use of a communication mode (e.g., texting, e-mail, web browsing, and/or the like) of a device, one or more deviations from historical movement patterns for the terrain, the particular subsystem, and/or the like, a vehicle operator having a home location with different traffic patterns than those in a current locale, a low level of visibility, a compromised line of sight, an inclement-weather condition, and an insufficient available reaction time, among numerous other example current movement anomalies that could be listed here. In various different embodiments, statistical analytical techniques are employed to determine deviations from patterns and/or one or more other current movement anomalies.

At step 806, responsive to identifying the instance in step 804, the RASS 128 issues at least one warning to at least one of the subsystems in the identified subset. In various different embodiments, step 806 involves the RASS 128 issuing one or more warnings to one or more slow-moving subsystems and/or one or more fast-moving subsystems. In various different embodiments, issuing warnings involves transmitting messages via V2V communication, V2P communication, and/or V2I communication, among other possibilities. In some embodiments, step 806 involves transmitting one or more warning messages from, via, and/or to one or more mesh-network nodes.

In one or more embodiments, issuing a warning to a subsystem involves presenting at least one warning indication via a user interface of the subsystem. The at least one presented warning indication could be visual (e.g., flashing a screen (of, e.g., a smartphone), a textual message, etc.), audible (e.g., one or more spoken words, an alarm sound, etc.), and/or tactile (e.g., vibration, perhaps according to a particular temporal pattern). In some embodiments, the at least one warning includes a recommendation to increase traveling distance between at least two subsystems in the identified subset, to reduce speed, and/or one or more other recommendations.

In various different embodiments, the at least one warning includes an identification of a subsystem type of at least one of the subsystems in the identified set, an identification of an alternate path (e.g., a bike path) available to one or more of the subsystems in the identified subset, and/or one or more other messages.

In an embodiment, the method 800 is carried out by one of the subsystems in the identified subset. In at least one such embodiment, step 806 involves presenting at least one warning indication via a user interface of that particular subsystem. In some embodiments, that particular subsystem does not effect warnings being issued via any other subsystems; in other embodiments, that particular subsystem does also effect warnings being issued via one or more other subsystems in the identified set.

In a variation of any of the previous embodiments, a RASS is communicatively coupled to a database that contains information pertaining to risk factors including stolen vehicles, drunk driving histories and the like. In the present variation, upon determining that a vehicle is stolen, the RASS could be used with an engine to remove or reduce power, or stop a vehicle. The RASS may also be used with an engine to remove or reduce power if the RASS determines that the vehicle is stole. In both variations, the RASS may identify a safe stopping area prior to reducing or removing power, such as a shoulder or rest area, to prevent creating an unsafe condition.

IV. Example Scenarios

A. Traffic Intersection

Figure 9:
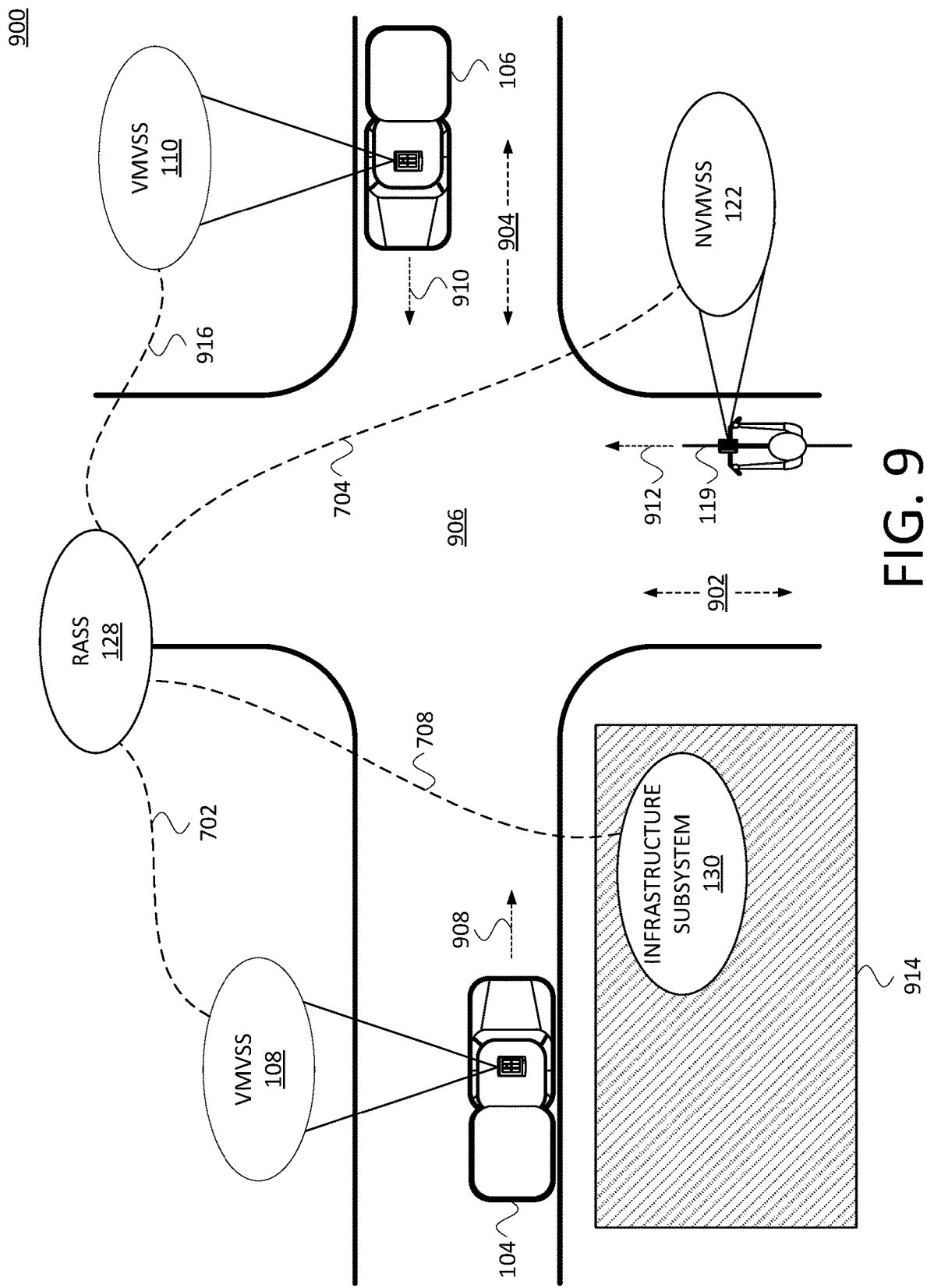
FIG. 9 is a diagram of a first example scenario in which at least one embodiment could be carried out or utilized.

FIG. 9 depicts an example scenario 900 in which a street 902 intersects a street 904 at an intersection 906. Assuming a north-up orientation (as is also assumed for FIGS. 10-13), a building 914 on the southwest corner of the intersection 906 has mounted thereon the ISS 130. The vehicle 104 having the VMVSS 108 is currently west of the intersection 906 and is proceeding east on the street 904 as indicated by an arrow 908. The vehicle 106 having the VMVSS 110 is currently east of the intersection 906 and is proceeding west on the street 904 as indicated by an arrow 910. A person is riding the bicycle 119 having the NVMVSS 122 removably attached thereto, is currently south of the intersection 906 and is proceeding north on the street 902 as indicated by an arrow 912. The RASS 128 is communicatively connected to the VMVSS 108 via the communication link 702, to the ISS 130 via the communication link 708, to the NVMVSS 122 via the communication link 704, and to the VMVSS 110 via a communication link 916.

In this scenario, any number of warning messages could be issued by the RASS 128 to the VMVSS 108, the VMVSS 110, and/or the NVMVSS 122. Moreover, in some embodiments, the RASS 128 issues one or more warnings to one or more of those subsystems via the ISS 130. And certainly numerous other possible scenarios could be described herein. In this case, the RASS 128 may identify an impending three-way collision and may further identify the current movement anomaly that there is a compromised line-of-sight for the VMVSS 108 with respect to the NVMVSS 122 and vice versa, as well as a compromised line-of-sight for the VMVSS 110 with respect to the NVMVSS 122 and vice versa. As another example, the RASS 128 may detect the anomaly that, in spite of a traffic signal (not pictured) being red for vehicles on the street 904, one or both of the VMVSS 108 and the VMVSS 110 are moving at too high a rate of speed to be able to stop safely without entering the intersection 906. Other current movement anomalies could include time of day (i.e., darkness), inclement weather (e.g., fog), and/or the like.

B. Street: Car and Pedestrian

Figure 10:
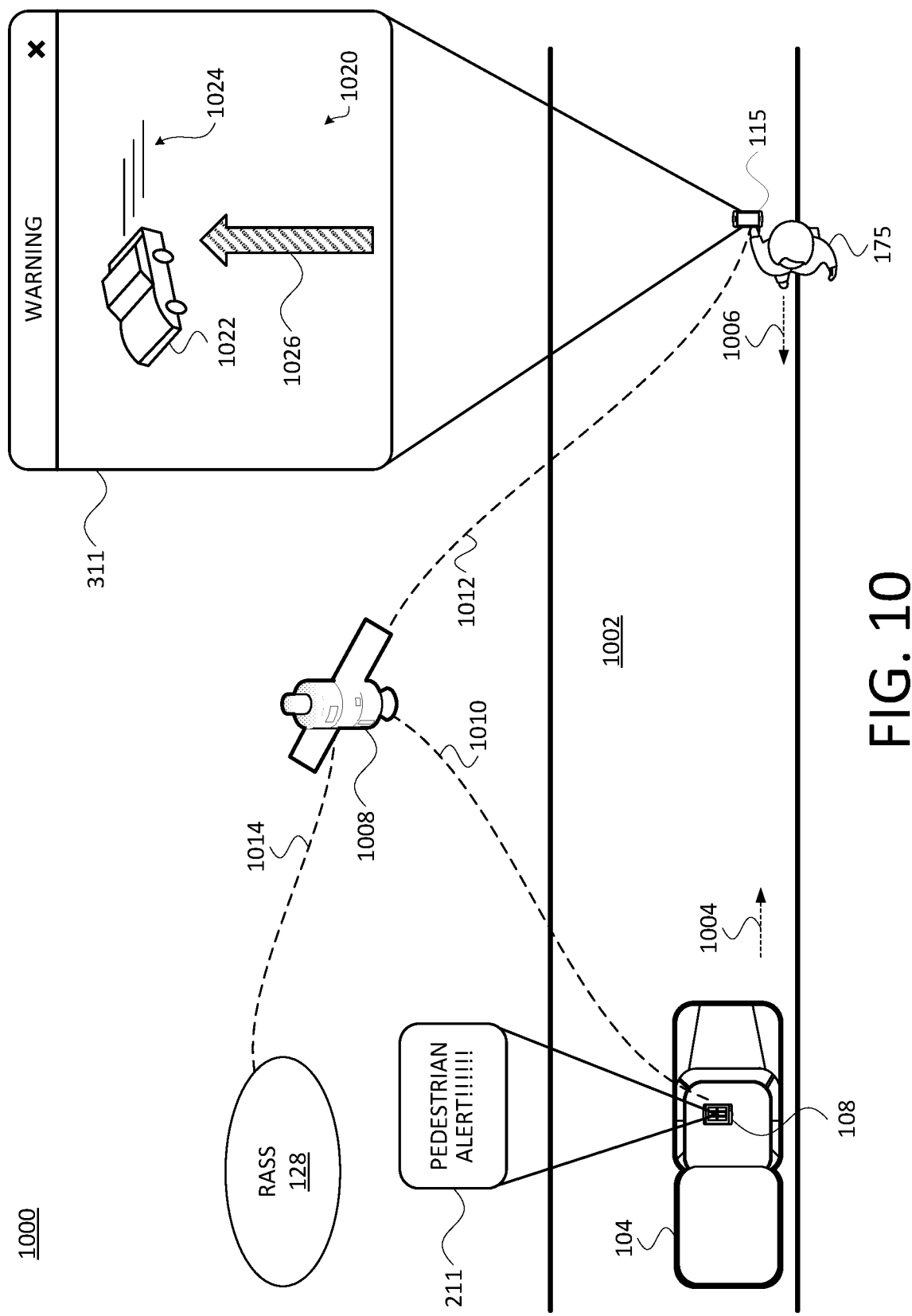
FIG. 10 is a diagram of a second example scenario in which at least one embodiment could be carried out or utilized.

FIG. 10 depicts an example scenario 1000 in which the vehicle 104 having the VMVSS 108 is moving east on a street 1002 as indicated by an arrow 1004 and is currently positioned west of the user 175, who is carrying the NVSS 115 and is walking west on the south side of the street 1002 as indicated by an arrow 1006. Moreover, the RASS 128 is communicatively connected via a communication link 1014 to a satellite 1008, which in turn is communicatively connected to the VMVSS 108 via a communication link 1010 and to the NVSS 115 via a communication link 1012.

In an example operation, the RASS carries out the method 800 and determines (A) that the likelihood of a collision between the VMVSS 108 and the NVSS 115 exceeds a collision-probability threshold and (B) one or both of the VMVSS 108 and the NVSS 115 has at least one current movement anomaly. As to the latter, as some examples, it could be dark, it could be foggy, the VMVSS 108 could be traveling too fast and/or swerving too much, the NVSS 115 could be currently engaged in an active voice call, and/or one or more other current movement anomalies could be present. In the depicted embodiment, the RASS 128 issues warnings both to the VMVSS 108 in the form of a message that reads "PEDESTRIAN ALERT" on the display 211 and to the NVSS 115 in the form of a graphic 1020 that shows an icon of a vehicle 1022 having speed lines 1024 to indicate a high rate of speed and an arrow 1026 that indicates that the speeding car is dead ahead. The NVSS 115 may also issue audible and/or tactile alerts, especially to disrupt an ongoing voice call. In some embodiments, the RASS 128 commands the NVSS 115 to flash its display as a way of warning an operator of the vehicle 104 of the presence of the pedestrian. And certainly other examples could be listed as well.

C. Street: Car and Bicyclist

Figure 11:
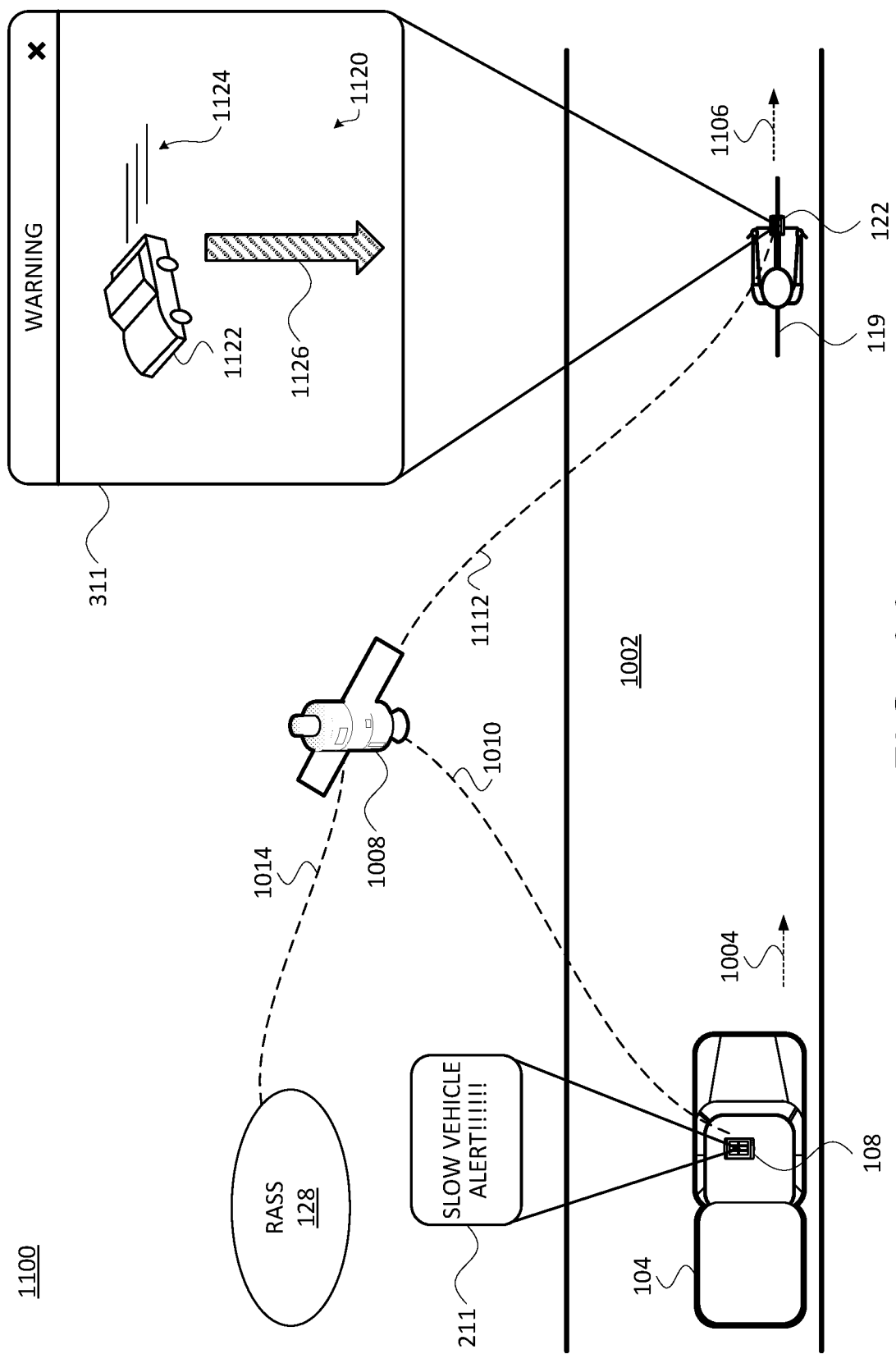
FIG. 11 is a diagram of a third example scenario in which at least one embodiment could be carried out or utilized.

FIG. 11 depicts an example scenario 1100 that is somewhat similar to the scenario 1000, though the user 175 and the NVSS 115 have been replaced by a cyclist operating the bicycle 119 having the NVMVSS 122 attached thereto—eastward of the vehicle 104 and eastbound on the street 1002 as indicated by an arrow 1106. The satellite 1008 is communicatively connected to the NVMVSS 122 via a communication link 1112.

In this scenario, upon detecting an imminent collision between the VMVSS 108 and the NVMVSS 122, the RASS 128 causes a "SLOW VEHICLE ALERT!!!!!" message to be presented on the display 211 of the VMVSS 108 and also causes a graphic 1120 to be displayed on the display 311 of the NVMVSS 122. In the example graphic 1120, a similar car icon 1122 having speed lines 1124 is presented, along with an arrow 1126 that in this case is facing downwards to indicate to the cyclist that the speeding car is approaching from behind the cyclist.

In various different embodiments, arrows could be used to indicate the direction from which a threat is approaching and could be color-coded to indicate the seriousness of the threat (e.g., proximity, heading, vehicle type, vehicle size, and/or the like). In this instance the one or more current movement anomalies detected by the RASS 128 could include examples such as excessive closing speed, acceleration, swerving, and/or the like on the part of the VMVSS 108, darkness, inclement weather, limited lines of sight, hilliness and/or curviness of the street 1002, and/or one or more other current movement anomalies.

D. Street and Bike Path: Car and Bicyclist

Figure 12:
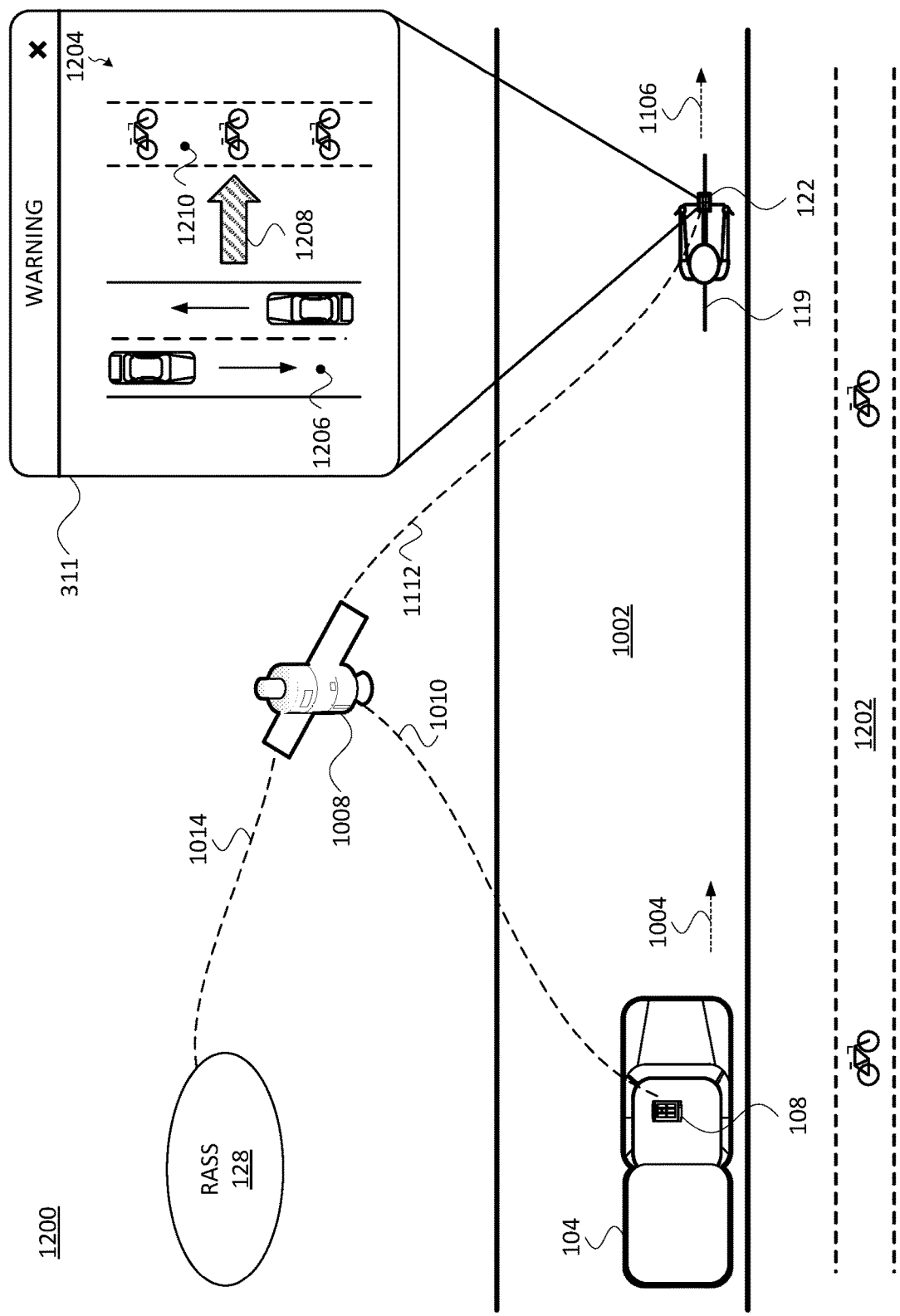
FIG. 12 is a diagram of a fourth example scenario in which at least one embodiment could be carried out or utilized.

FIG. 12 depicts an example scenario 1200 in which many aspects are the same as in the scenario 1100 of FIG. 11 and therefore are not repeated here. In the scenario 1200, one difference is that there is a bike path 1202 available to the south of the street 1002. Upon making the determination to issue one or more warnings, the RASS 128 issues a warning to the NVMVSS 122 that causes the presentation on the display 311 of a graphic 1204 that shows a street 1206 that is meant to represent the street 1002 in this case, an arrow 1208 pointing to the right, and a bike path 1210 on the right that is meant to indicate the presence in this case of the bike path 1202 off to the right of the bicyclist. Similar approaches could be used in cases where bike paths or other alternate routes are available on the opposite side of the street. In some instances, an infrastructure-subsystem beacon could instead or in addition be flashing an, e.g., right-pointing arrow and bike-path text and/or icon to alert the cyclist to the alternate route.

E. Parking Lot: Trucks and Loading-Dock Personnel

Figure 13:
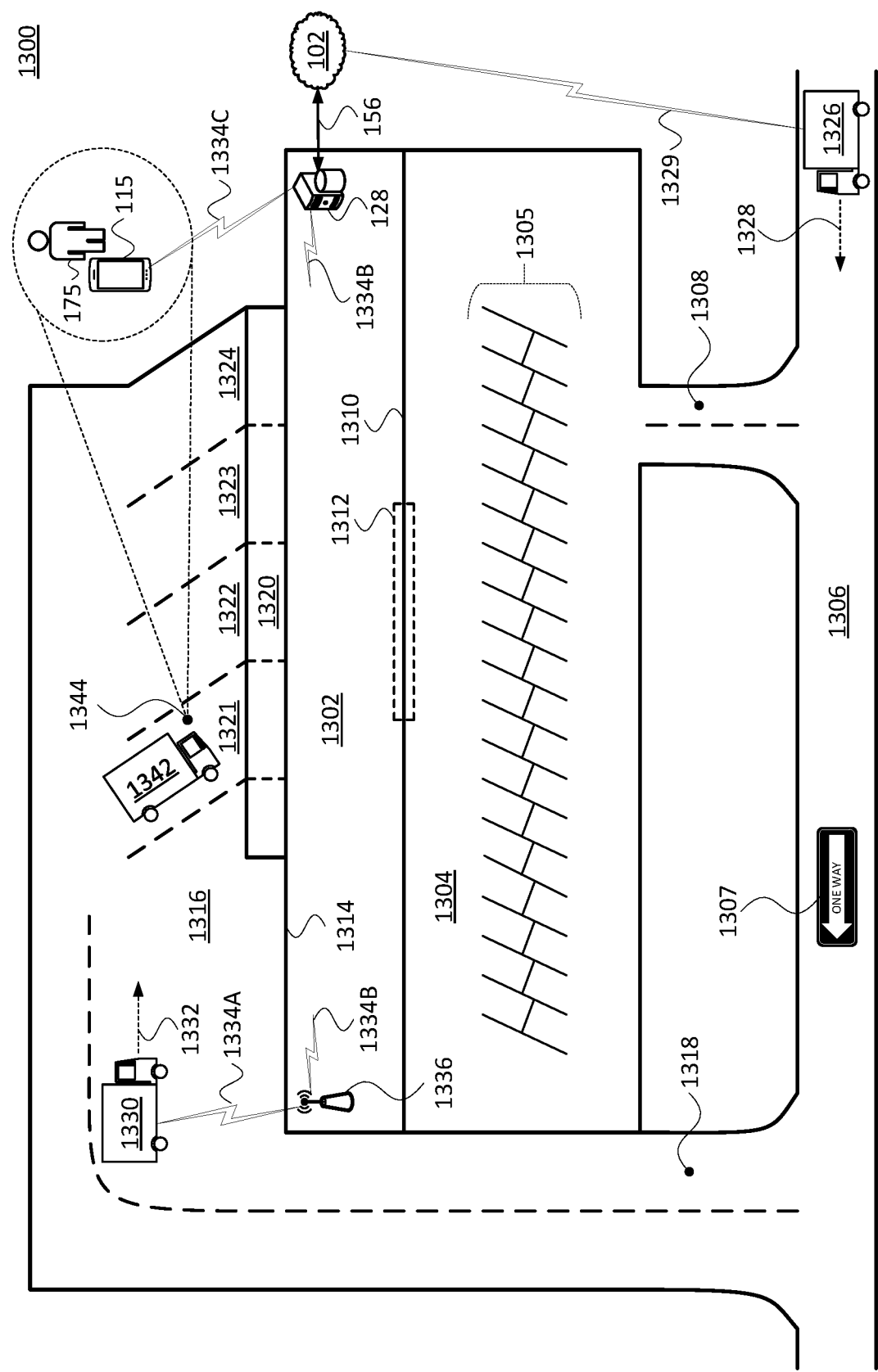
FIG. 13 is a diagram of a fifth example scenario in which at least one embodiment could be carried out or utilized.

FIG. 13 depicts an example scenario 1300 in which a facility 1302 (e.g., a big box store, a warehouse, a fulfillment center, a factory, and/or the like) has a front side 1310 and a back side 1314. The front side 1310 includes a front entrance area 1312 and the back side 1314 includes a loading dock 1320 that abuts an example set of four loading/unloading stations 1321-1324. The front side 1310 faces a front parking lot 1304 having parking spaces 1305 for customers and the like. Access to the front parking lot 1304 is available from a street 1306 via a driveway 1308. The back side 1314 faces a back parking lot 1316 that includes the loading/unloading stations 1321-1324 and is accessible form the street 1306 via a driveway 1318. As indicated by the one-way sign 1307, the street 1306 is one-way west.

Also depicted in the scenario 1300 are three trucks 1326, 1330, and 1342. The truck 1326 is proceeding westbound on the street 1306 (as indicated by an arrow 1328) and includes a VMVSS (not shown) that is communicatively connected via a communication link 1329 with the network 102, which in turn is communicatively connected via a communication link 156 via the RASS 128, which in this particular situation is depicted as residing within the facility 1302.

As shown, in this example, the RASS 128 is also communicatively connected via a communication link 1334B with a wireless access point 1336 and via a communication link 1334C with the NVSS 115. The wireless access point 1336 is also communicatively connected via a communication link 1334A with a VMVSS (not depicted) of the truck 1330. In FIG. 13, the communication links 1334A, 1334B, and 1334C are so numbered to indicate that they are all links on a common Wi-Fi network, though this is by way of example and not limitation. As shown by an arrow 1332, the truck 1330 is currently positioned in near a western end of—and is proceeding eastbound in—the back parking lot 1316. One or more of the truck 1326, the truck 1330, and the truck 1342 could be 18-wheelers and/or trucks or other vehicles of any other size. In the depicted example, each of them is an 18-wheeler.

Furthermore, in this example, the truck 1342 is not communicatively connected at this moment with any other entity or entities. The user 175 in this example is carrying his or her NVSS 115, and is currently positioned in the loading/unloading station 1321 down near the wheels of the truck 1342 (depicted by dot 1344), perhaps chocking the wheels to keep them stationary and promote safety, as is known in the art. In the depicted scenario, then, the user 175 may well be in danger due to the oncoming nature of the truck 1330. Indeed, it may be the case that one or both of the user 175 and the operator of the truck 1330 are unaware of each other.

Due to a number of factors including the availability of the adjoining loading/unloading station 1322, the RASS 128 may calculate that the likelihood of a collision between (a VMVSS of) the truck 1330 and (the NVSS 115 being carried by) the user 175 is greater than a collision-probability threshold. The RASS 128 may further determine the presence of at least one current movement anomaly such as a lack of line-of-sight, an excessive speed of the truck 1330, the NVSS 115 currently being operated in a texting mode or voice-call mode, and/or one or more other current movement anomalies. Upon making those determinations, the RASS 128 in this example responsively issues warnings to both the truck 1330 and the NVSS 115, and may also trigger one or more infrastructure elements (e.g., sirens, flashing lights, and/or the like) to issue alerts as well, all in an effort to avoid any collisions and their accompanying injuries, property damage, and the like. Safety is the primary concern.

In a variation of the foregoing example, one or more of the trucks 1326, 1330, and 1342 are electric or hybrid vehicles. The facility 1302 includes the loading dock 1320 that abuts the loading/unloading stations 1321-1324 and is accessible from the street 1306 via a driveway 1318. The RASS 128 is communicatively connected with the NVSSs 115 of laborers (i.e. users 175) in the vicinity of the loading dock 1320 and the VMVSS (not depicted) of the truck 1330. The laborers may might not hear the trucks due to their quiet nature relative to, for example, diesel engines. Indeed, it may be the case that one or more of the users 175 and the operators of the trucks are unaware of each other. The RASS 128 may determine as a current movement anomaly the presence of a user within a "movement zone" of the vehicle. For example, if the truck is backing-up, the movement zone would be the area adjacent the rear and sides of the truck which encompasses possible future positions of the truck due to the driver changing direction. The purpose of the movement zone is to reduce notification instances that would be generated by the RASS 128 if movement alone were sufficient to trigger a warning. In this manner warnings are avoided if there are no users in the movement zone and the truck is moving backward, even if users are present in front of the truck. The reverse is also possible, wherein the movement zone would be in front and adjacent the sides of the truck if the truck were moving forward.

Upon making those determinations, the RASS 128 may responsively issue warnings to the NVSSs 115 or and may trigger one or more infrastructure elements (e.g., sirens, flashing lights, and/or the like in the loading dock or light posts or overhead signs) to issue alerts as well, all in an effort to avoid any collisions and their accompanying injuries, property damage, and the like. The truck may also issue warnings or alarms via the WTLM 514 and, for example, a sound or light broadcast from a horn or illuminating device on its frame. In this variation, the RASS 128 may be incorporated in the truck. Although disclosed with reference to electric trucks, the movement zone may be determined with respect to other vehicles, including pick-up trucks, cars, buses, and any other electric vehicle. For example, the present variation may find applicability in a school parking lot to assist bus drivers and enhance school safety.

What is claimed is:

1. A method comprising:
   collecting, via at least one wireless communications network, movement data pertaining to each subsystem in a plurality of subsystems, wherein the plurality of subsystems comprises at least one slow-moving subsystem and/or at least one fast-moving subsystem categorized as such based at least in part on a capability for fast movement, a current movement characteristic, and/or recent movement characteristic, wherein a slow-moving subsystem is constituted by either a slow-moving subsystem or a fast-moving subsystem that is associated with a vulnerable road user, and the at least one fast-moving subsystem is constituted by a fast-moving subsystem that is associated with a nonvulnerable road user;
   automatically calculating, by at least one processor and without human intervention, a likelihood of a collision occurring among an identified subset of the plurality of subsystems;
   automatically comparing, by the at least one processor and without human intervention, the likelihood of a collision occurring to a collision-probability threshold;
   automatically determining, by the at least one processor and without human intervention, whether a current movement anomaly, including both of (1) a deviation in applicable traffic rules related to movement pattern, speed, acceleration, or deceleration and (2) a compromised line of sight in which there is an intervening subsystem physically obstructing a line of sight to an otherwise unobstructed line of sight to another subsystem so as to block sight of the another subsystem, that exists in at least one of the subsystems in the identified subset of the plurality of subsystems;
   identifying, by the at least one processor and without human intervention based at least in part on the collected movement data, an instance in which each warning-triggering condition in a set of warning-triggering conditions is true, wherein the set of warning-triggering conditions comprises:
   that the likelihood of a collision occurring among an identified subset of the plurality of subsystems is greater than the collision-probability threshold; and
   that at least one of the subsystems in the identified subset has at least one current movement anomaly; and
   response to identifying the instance, issuing at least one warning to at least one of the subsystems in the identified subset.

2. The method of claim 1, wherein the movement data pertaining to at least one of the subsystems in the plurality of subsystems reflects one or more of position, positional accuracy, location, latitude, longitude, elevation, speed, acceleration, trajectory, transmission state, heading, steering-wheel angle, vehicle type, vehicle size, surface coefficient of friction, weather, temperature, precipitation, recent degree of active status of a traction-control system, recent degree of active status of an antilock braking system (ABS), and exterior-lights status.

3. The method of claim 1, wherein the identified subset comprises a slow-moving subsystem, and wherein issuing the at least one warning comprises issuing at least one warning to the slow-moving subsystem.

4. The method of claim 3, wherein the identified subset further comprises a fast-moving subsystem, and wherein issuing the at least one warning comprises issuing at least one warning to the fast-moving subsystem, wherein the at least one warning comprises a recommendation to reduce speed.

5. The method of claim 1, further comprising receiving a message containing the likelihood of a collision occurring among the identified subset of the plurality of subsystems.

6. The method of claim 1, wherein automatically calculating the likelihood of a collision occurring among the identified subset of the plurality of subsystems includes automatically calculating the likelihood of a collision based on a set of one or more collision criteria including location and trajectory of the subsystems in the identified subset.

7. The method of claim 1, wherein identifying that the likelihood of a collision occurring among an identified subset of the plurality of subsystems is greater than the collision-probability threshold comprises receiving a message indicating that the likelihood of a collision occurring among the identified subset of the plurality of subsystems is greater than the collision-probability threshold.

8. The method of claim 1, further comprising selecting a value for the collision-probability threshold based at least in part on a current time of day.

9. The method of claim 1, further comprising selecting a value for the collision-probability threshold based at least in part on a terrain characteristic including at least one of a topological terrain characteristic or an accident rate.

10. The method of claim 1, further comprising selecting a value for the collision-probability threshold based at least in part on a weather condition.

11. The method of claim 1, wherein the at least one current movement anomaly comprises an erratic movement pattern that has one or more deviations from historical movement patterns for a terrain and/or that particular subsystem.

12. The method of claim 1, wherein the at least one current movement anomaly comprises excessive speed.

13. The method of claim 1, wherein the at least one current movement anomaly comprises excessive acceleration or deceleration.

14. The method of claim 1, wherein issuing at least one warning to at least one of the subsystems in the identified subset comprises transmitting the at least one warning at least from, via, or to one or more mesh-network nodes.

15. The method of claim 1, wherein issuing a warning to a subsystem comprises presenting at least one warning indication via a user interface of the subsystem.

16. The method of claim 3, wherein the at least one warning comprises an identification of an alternate path.

17. A risk-assessment system comprising:
    a communication interface;
    at least one processor; and data storage that contains instructions executable by the processor for carrying out a set of risk-assessment-system functions, the set of risk-assessment-system functions comprising:

collecting, via the communication interface, movement data pertaining to each subsystem in a plurality of subsystems, wherein the plurality of subsystems comprises at least one slow-moving subsystem and/or at least one fast-moving subsystem categorized as such based at least in part on a capability for fast movement, a current movement characteristic, and/or recent movement characteristic, wherein a slow-moving subsystem is constituted by either a slow-moving subsystem or a fast-moving subsystem that is associated with a vulnerable road user and a fast-moving subsystem is constituted by a fast-moving subsystem that is associated with a nonvulnerable road user;

automatically calculating, by the processor and without human intervention, a likelihood of a collision occurring among an identified subset of the plurality of subsystems;

automatically comparing, by the processor and without human intervention, the likelihood of a collision occurring to a collision-probability threshold;

automatically determining, by the at least one processor and without human intervention, whether a current movement anomaly, including both of (1) a deviation in applicable traffic rules related to movement pattern, speed, acceleration, or deceleration and (2) a compromised line of sight in which there is an intervening subsystem physically obstructing relative to an otherwise unobstructed line of sight to another subsystem so as to block sight of the another subsystem, that exists in at least one of the subsystems in the identified subset of the plurality of subsystems;

identifying, by the processor and without human intervention based at least in part on the collected movement data, an instance in which each warning-triggering condition in a set of warning-triggering conditions is true, wherein the set of warning-triggering conditions comprises:

that the likelihood of a collision occurring among an identified subset of the plurality of subsystems is greater than the collision-probability threshold; and that at least one of the subsystems in the identified subset ahs at least one current movement anomaly; and responsive to identifying the instance, issuing at least one warning to at least one of the subsystems in the identified subset.

18. A non-transitory computer-readable medium containing instructions executable by a processor for carrying out a set of risk-assessment-system functions, the set of risk-assessment-system functions including:

collecting movement data pertaining to each subsystem in a plurality of subsystems, wherein the plurality of subsystems comprises at least one slow-moving subsystem and/or at least one fast-moving subsystem categorized as such based at least in part on a capability for fast movement, a current movement characteristic, and/or recent movement characteristic, wherein a slow-moving subsystem is constituted by either a slow-moving subsystem or a fast-moving subsystem that is associated with a vulnerable road user and the at least one fast-moving subsystem is constituted by a fast-moving subsystem that is associated with a nonvulnerable road user;

identifying, based at least in part on the collected movement data, an instance in which each warning-triggering condition in a set of warning-triggering conditions is true, wherein the set of warning-triggering conditions comprises:

that a likelihood of a collision occurring among an identified subset of the plurality of subsystems is greater than a collision-probability threshold; and that at least one of the subsystems in the identified subset has at least one current movement anomaly, including both (1) a deviation in applicable traffic rules related to movement pattern, speed, acceleration, or deceleration and (2) a compromised line of sight in which there is an intervening subsystem physically obstructing a line of sight to an otherwise unobstructed line of sight to another subsystem so as to block sight of the another subsystem, that exists in at least one of the subsystems in the identified subset of the plurality of subsystems; and response to identifying the instance, issuing at least one warning to at least one of the subsystems in the identified subset.

19. The method of claim 1, wherein the current movement anomaly is determined to be only when a user is present within a movement zone of the at least one of the subsystems, wherein the movement zone is defined by one or more areas adjacent the subsystem which encompasses possible future positions of the subsystem.

20. The method of claim 1, wherein the current movement anomaly further includes (3) poor visibility due to weather conditions or darkness.

21. The method of claim 1, wherein the warning includes a recommendation to increase traveling distance and/or to reduce speed between at least two subsystems in the identified subset.

* * * * *